(12) United States Patent  (10) Patent No.: US 8,626,419 B2
Mitchell et al.  (45) Date of Patent: Jan. 7, 2014

(54) SYSTEM AND METHOD FOR AUTOMATED IDENTIFICATION OF FREQUENT STOP LOCATIONS FOR VEHICLE FLEETS

(71) Applicant: Fleetmatics IRL Limited, Dublin (IE)

(72) Inventors: Peter Mitchell, Dublin (IE); Ovidiu Mircea Mocanu, Lakewood, OH (US); Takeshi Sato, Dublin (IE)

(73) Assignee: Fleetmatics IRL Limited, Dublin (IE)

( * ) Notice: Subject to any disclaimer, the term of this patent is extended or adjusted under 35 U.S.C. 154(b) by 0 days.

(21) Appl. No.: 13/632,231

(22) Filed: Oct. 1, 2012

(65) Prior Publication Data

US 2013/0289846 A1   Oct. 31, 2013

Related U.S. Application Data

(63) Continuation of application No. 13/458,088, filed on Apr. 27, 2012, now abandoned.

(51) Int. Cl.
*G01S 5/02* (2010.01)
*G01C 21/00* (2006.01)
*G08G 1/0967* (2006.01)

(52) U.S. Cl.
USPC ...... 701/99; 701/424; 342/357.07; 455/456.1

(58) Field of Classification Search
USPC ............... 701/99, 423, 424; 340/905; 705/9; 342/357.07; 455/456.1
See application file for complete search history.

(56) References Cited

U.S. PATENT DOCUMENTS

| 2007/0087760 A1* | 4/2007 | Ogino et al. | 455/456.1 |
| 2013/0054134 A1* | 2/2013 | Wang et al. | 701/424 |

* cited by examiner

*Primary Examiner* — Tan Q Nguyen
(74) *Attorney, Agent, or Firm* — Frommer Lawrence & Haug LLP

(57) ABSTRACT

A system and method and system flow for processing GPS event data to identify frequent stop location in accord with embodiments as described herein. The method comprises identifying a stop location for a vehicle. The method comprises recording vehicle stops for an entity associated with the vehicle over a predetermined period of time. For example, stops are collected or processed for a predetermined time period. If the number of stops meets the threshold number of stops, the area is identified as a frequent stop location.

68 Claims, 18 Drawing Sheets

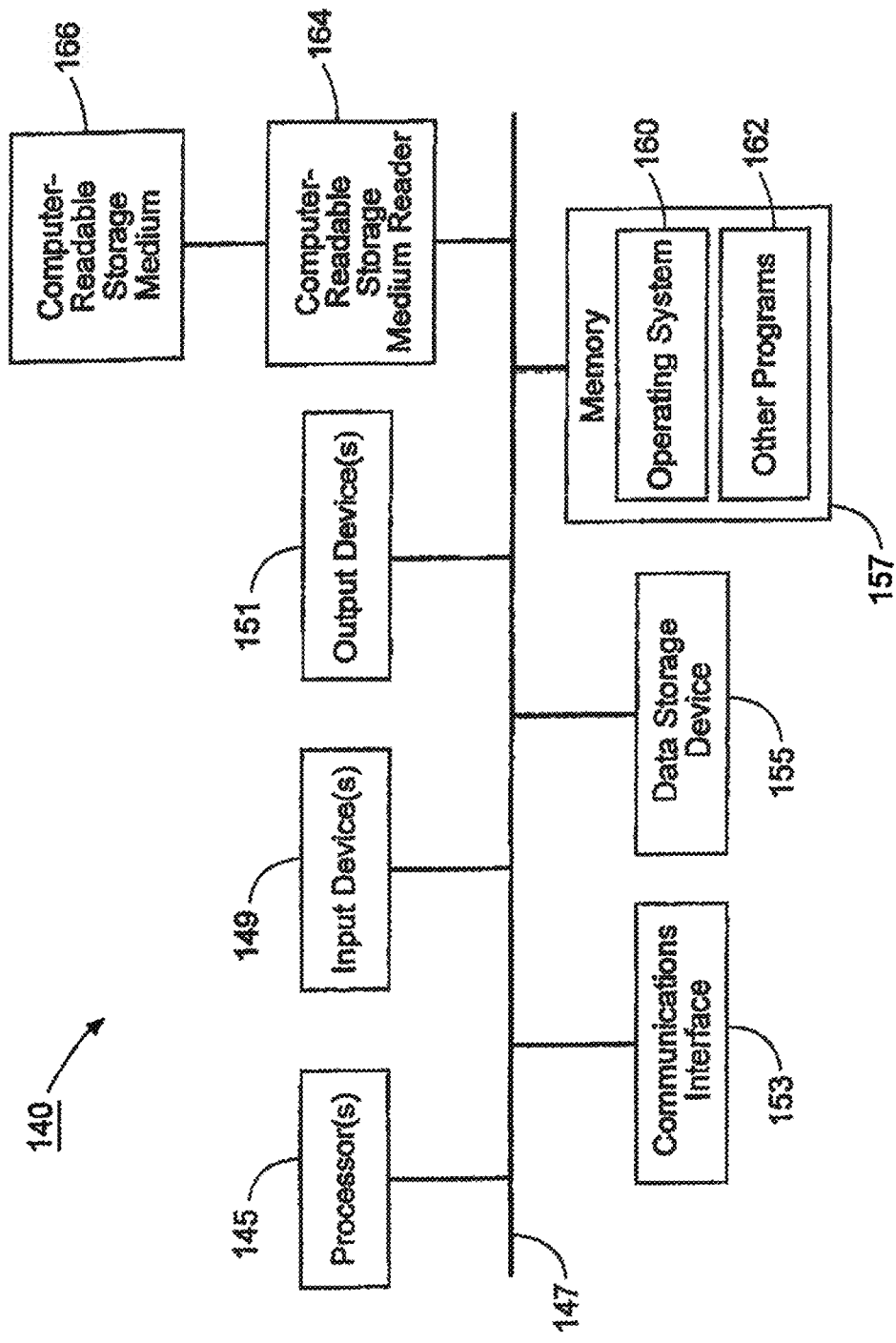

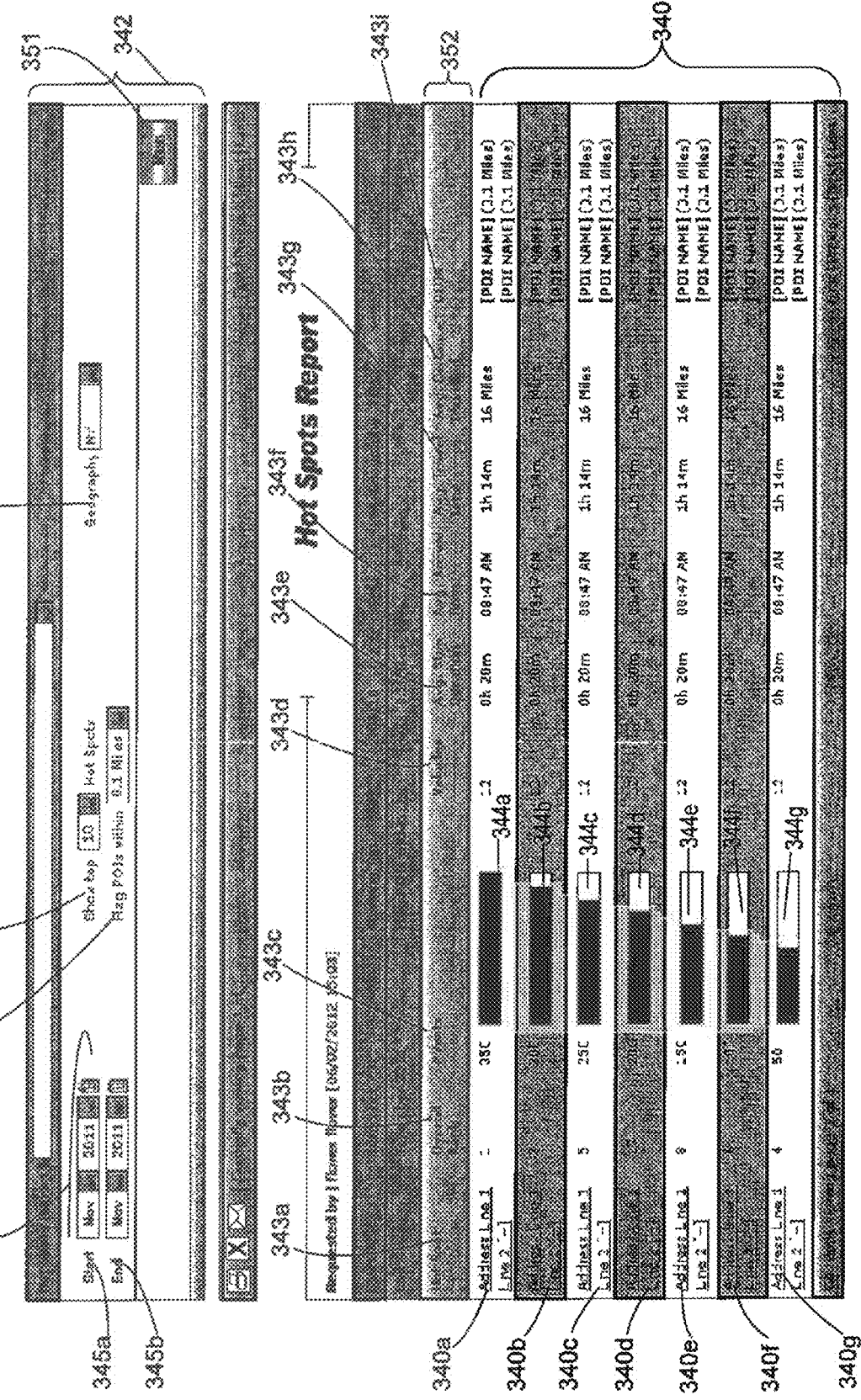

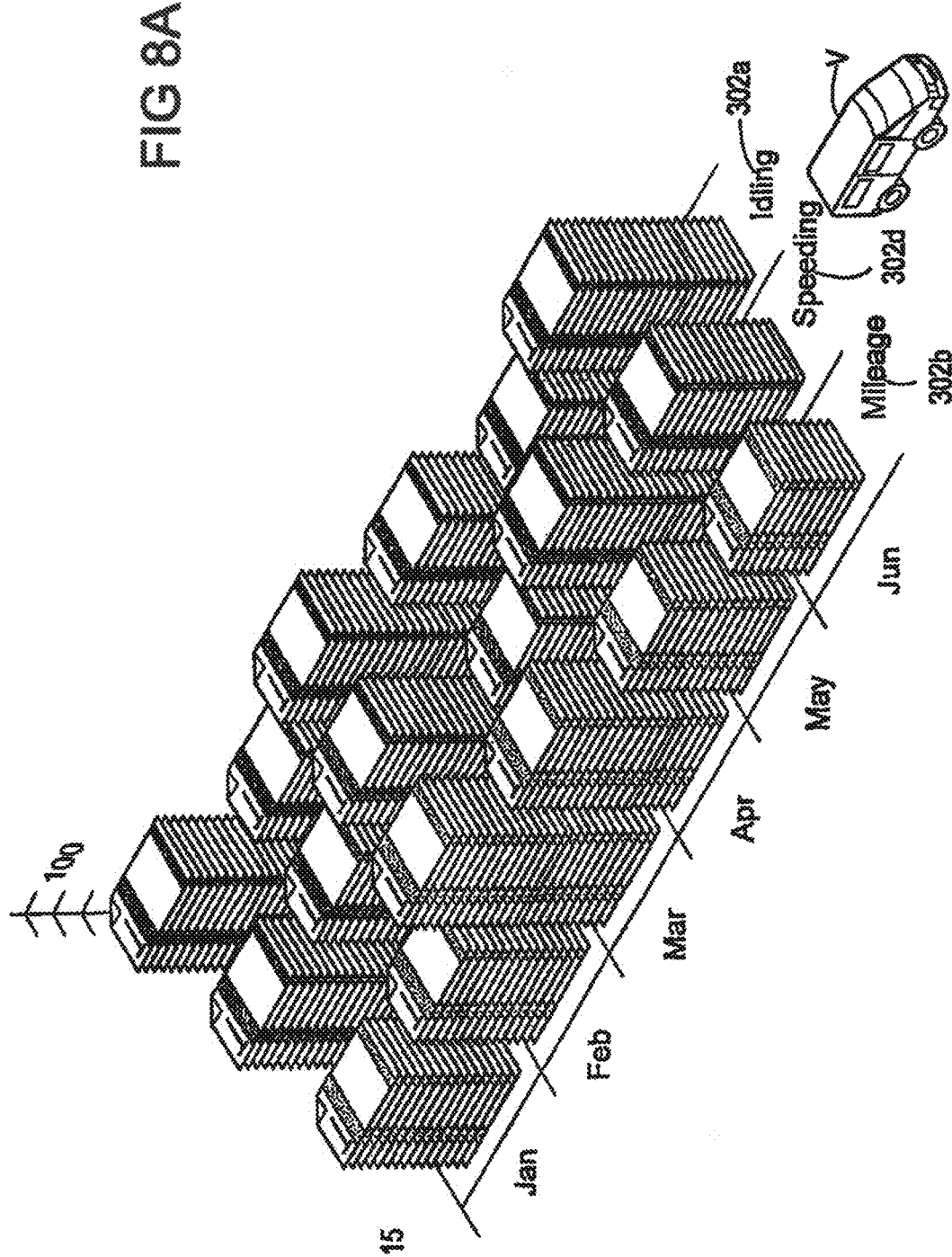

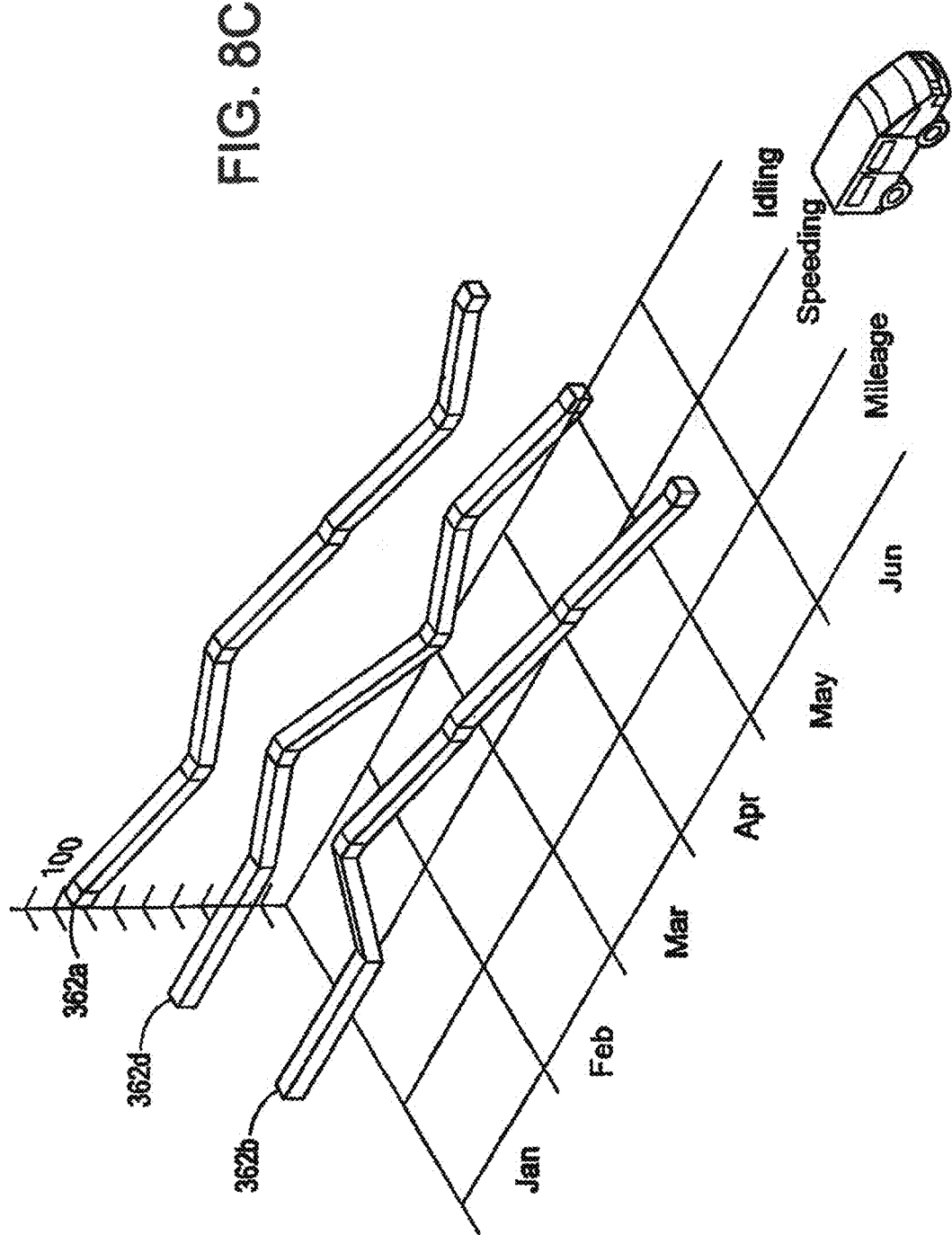

SYSTEM AND METHOD FOR AUTOMATED IDENTIFICATION OF FREQUENT STOP LOCATIONS FOR VEHICLE FLEETS

DESCRIPTION OF RELATED ART

It is known to provide an on-board unit which uses technology such as GPS (Global Positioning System) to monitor a vehicle's positions and transmit wireless uploads to a central host system as well as manage of incoming data traffic without data losses or corruption and/or without database record locking. Such a unit may also upload vehicle status events such as engine fault events. GB2345824 and U.S. Pat. No. 7,388,518 describes such systems and methods therefor, the entirety of each of which are incorporated by reference herein.

SUMMARY OF THE INVENTION

Disclosed is a computer system including at least one computer processor and computer readable storage medium or media including computer code and at least one storage device in which is stored GPS data for at least one vehicle the system comprising: a memory including a GPS event database including GPS event data transmitted from at least one GPS device, each GPS device associated with a vehicle, and stored over a period of time. The one or more processors programmed at least to receive GPS event data transmitted from at least one GPS device, each GPS device associated with a vehicle, the event GPS event data including location information for the vehicle; store the GPS event data in a GPS event database operatively coupled to at least one of the processors; analyze the GPS event data to derive and record vehicle stops for at least one vehicle determine if the number of stops meets a location identification criterion; and automatedly identify at least one frequent stop location based on the vehicle stops. The one or more processors are further programmed at least to: identify a stop location for a vehicle; define an area for the stop location; determine whether a number of the recorded vehicle stops in the area meets a threshold number of stops; and if the number of stops meets the threshold number of stops, identify the area as a frequent stop location.

Disclosed is method comprising, in at least one computer and a computer readable storage medium or media including computer code: receiving GPS event data transmitted from a plurality of GPS devices, each GPS device associated with a vehicle; storing in GPS event database operatively coupled to at least one of the processors, the GPS event data; analyzing the GPS event data to derive and record vehicle stops for at least one vehicle; determining if the number of stops meets a frequent stop location criterion; and automatedly identifying at least one frequent stop location based on the vehicle stops. The method further comprises identifying a stop location for a vehicle; defining an area for the stop location; determining whether a number of the recorded vehicle stops in the area meets a threshold number of stops; and if the number of stops meets the threshold number of stops, identifying the area as a frequent stop location.

Throughout the specification and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. Embodiments of the present invention are disclosed or are apparent from and encompassed by, the following description.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The use of the terms "a," "an," "at least one," "one or more," and similar terms indicate one of a feature or element as well as more than one of a feature. The use of the term "the" to refer to the feature does not imply only one of the feature and element.

When an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

The present invention will now be described in detail on the basis of exemplary embodiments. The invention disclosed herein may be practiced using programmable digital computers and networks therefor.

It will be appreciated by those skilled in the art that the foregoing brief description and the following detailed description are exemplary (i.e., illustrative) and explanatory of the present invention, but are not intended to be restrictive thereof or limiting of the advantages which can be achieved by this invention in various implementations. Additionally, it is understood that the foregoing summary and ensuing detailed description are representative of some embodiments of the invention, and are neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of embodiments of the invention.

BRIEF DESCRIPTION OF THE DRAWINGS

Embodiments are illustrated in the figures of the accompanying drawings, which are meant to be exemplary and not limiting, and in which like references are intended to refer to like or corresponding things.

FIGS. 1A-1D are block diagrams of a representative computer system.

FIGS. 3A-3E depicts exemplary representations for graphic user interfaces.

FIGS. 8A-8C show an exemplary flow showing GPS event data analysis.

DETAILED DESCRIPTION OF THE EMBODIMENTS

Figure 1B:
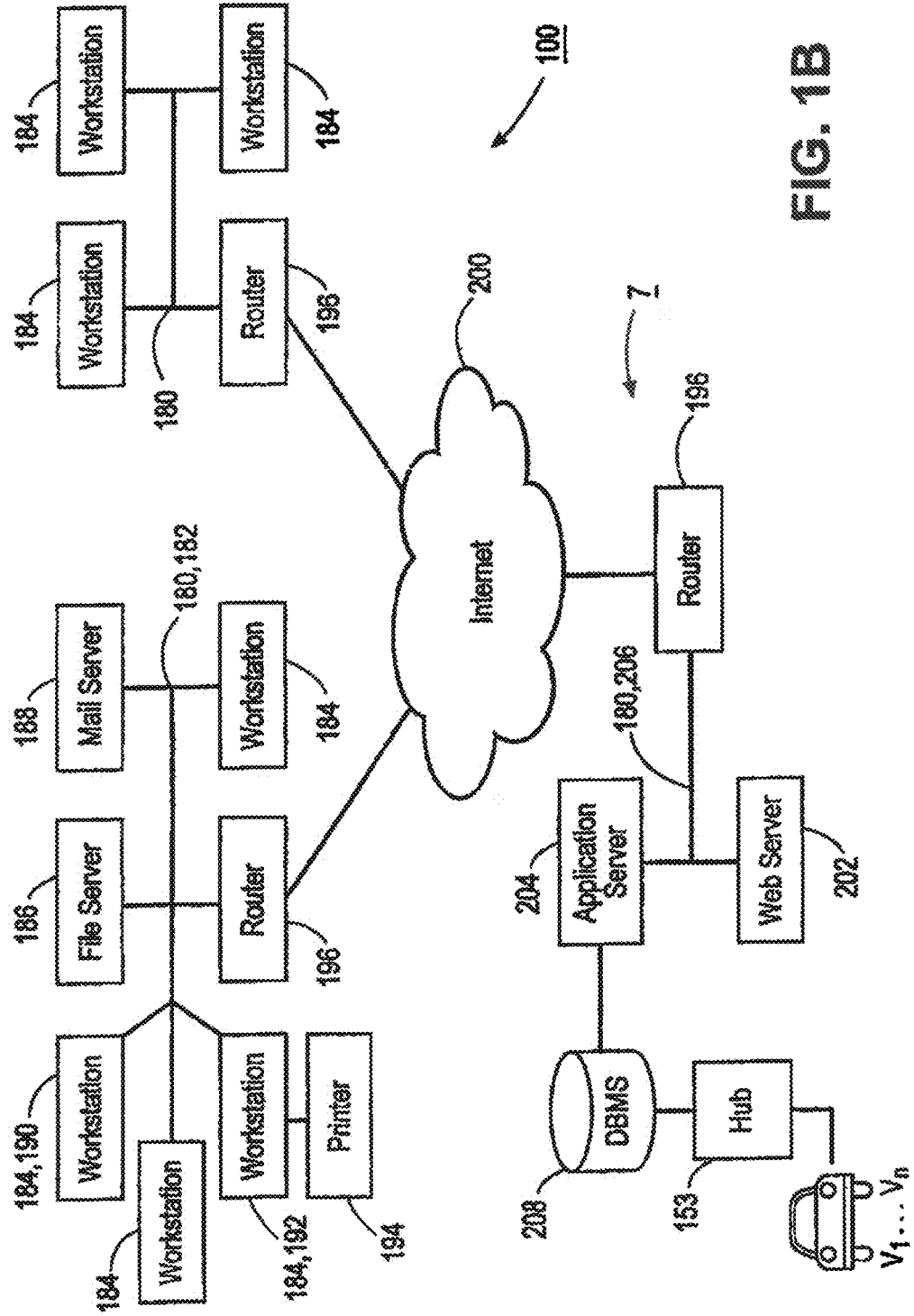

As shown in FIGS. 1A-1B, disclosed is a system 100, which includes a computer 140 containing a processor 145, memory 157 and other components typically present in general purpose computers.

FIG. 1A is a block diagram of a representative computer. The computer system 140 includes at least one processor 145, such as an Intel Core™ or Xeon™ series microprocessor or a Freescale™ PowerPC™ microprocessor, coupled to a communications channel 147. The computer system 140 further includes an input device 149 such as, e.g., a keyboard or mouse, an output device 151 such as, e.g., a CRT or LCD display, a communications interface 153, a data storage device 155 such as a magnetic disk or an optical disk, and memory 157 such as Random-Access Memory (RAM), each coupled to the communications channel 147. The communications interface 153 may be coupled to a network such as the Internet.

Memory 157 stores information accessible by processor 145, including instructions that may be executed by the processor 145. It also includes data that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 145 may be any well-known processor, such as processors from Intel Corporation or AMD. Alternatively, the processor may be a dedicated controller such as an ASIC.

The instructions may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

One skilled in the art will recognize that, although the data storage device 155 and memory 157 are depicted as different units, the data storage device 155 and memory 157 can be parts of the same unit or units, and that the functions of one can be shared in whole or in part by the other, e.g., as RAM disks, virtual memory, etc. It will also be appreciated that any particular computer may have multiple components of a given type, e.g., processors 145, input devices 149, communications interfaces 153, etc.

The data storage device 155 and/or memory 157 may store an operating system 160 such as Microsoft Windows 7®, Windows XP® or Vista™, Linux®, Mac OS®, or Unix®. Other programs 162 may be stored instead of or in addition to the operating system. It will be appreciated that a computer system may also be implemented on platforms and operating systems other than those mentioned. Any operating system 160 or other program 162, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified by processor 145 in accordance with the instructions. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

One skilled in the art will recognize that the computer system 140 may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 164, such as, e.g., a magnetic disk drive, magneto-optical drive, optical disk drive, or flash drive, may be coupled to the communications bus 147 for reading from a computer-readable storage medium (CRSM) 166 such as, e.g., a magnetic disk, a magneto-optical disk, an optical disk, or flash RAM. Accordingly, the computer system 140 may receive programs and/or data via the CRSM reader 164. Further, it will be appreciated that the term "memory" herein is intended to include various types of suitable data storage media, whether permanent or temporary, including among other things the data storage device 155, the memory 157, and the CSRM 166.

Two or more computer systems 140 may be connected, e.g., in one or more networks, via, e.g., their respective communications interfaces 153 and/or network interfaces (not depicted).

A computer system network is shown in FIG. 1B. A network 182 may, for example, connect one or more workstations 184 with each other and with other computer systems, such as file servers 186 or mail servers 188. The connection may be achieved tangibly, e.g., via Ethernet® or optical cables, or wirelessly, e.g., through use of modulated microwave signals according to the IEEE 802.11 family of standards. A computer system that participates in the network may send data to another computer system in the network via the network connection.

One use of a network 182 is to enable a computer system to provide services to other computer systems, consume services provided by other computer systems, or both. For example, a file server 186 may provide common storage of files for one or more of the workstations 190 on a network 182. A workstation 190 sends data including a request for a file to the file server 186 via the network 182 and the file server 186 may respond by sending the data from the file back to the requesting workstation 190.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

In one aspect, computer 204 is a server communicating with one or more client computers 184,192. For example, computer 204 may be a web server or a hub and data storage service. Each client computer may be configured similarly to the server 184, 192, with a processor, memory and instructions. Each client computer 184, 192 may be a personal computer, intended for use by a person, having all the internal components normally found in a personal computer such as a central processing unit (CPU) 145, display device 151 (for example, a monitor having a screen, a projector, a touchscreen, a small LCD screen, a television, or another device such as an electrical device that is operable to display information processed by the processor), CD-ROM, hard-drive, user input 149 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client computers 184, 192 may comprise a full-sized personal computer, the system and method may also be used in connection with mobile devices capable of wirelessly exchanging data with a server over a network such as the Internet. For example, client computer 184, 192 may be a wireless-enabled PDA such as an iPhone, and Android enabled smart phone, a Blackberry phone, or another Internet-capable cellular phone. In either regard, the user may input information using a small keyboard (in the case of a Blackberry phone), a keypad (in the case of a typical cell phone), a touch screen (in the case of a PDA and/or smart phone) or any other means of user input.

Client computers 184, 192 may include a component, such as circuits, to determine the geographic location of the device. For example, mobile device may include a GPS receiver. By way of further example, the component may include software for determining the position of the device based on other signals received at the mobile device, such as signals received at a cell phone's antenna from one or more cell phone towers if the mobile device is a cell phone.

Servers 186, 188, 202, 204 and client computers 184 and 192 are capable of direct and indirect communication, such as over a network 180, 200. Although only a few computers are depicted in FIGS. 1A-1B, it should be appreciated that a typical system can include a large number of connected computers, with each different computer being at a different node of the network 200. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

A network 182 may be connected to one or more other networks 180, e.g., via a router 196. A router 196 may also act as a firewall, monitoring and/or restricting the flow of data to and/or from a network 180 as configured to protect the network. A firewall may alternatively be a separate device (not pictured) from the router 196.

A network of networks 180 may be referred to as an internet. The term "the Internet" 200 refers to the worldwide network of interconnected, packet-switched data networks that uses the Internet Protocol (IP) to route and transfer data. A client and server on different networks may communicate via the Internet 200. For example, a workstation 190 may request a World Wide Web document, interface or other object from a Web Server 202. The Web Server 202 may process the request and pass it to, e.g., an Application Server 204. The Application Server 204 may then conduct further processing, which may include, for example, sending data to and/or receiving data from one or more other data sources. Such a data source may include, e.g., other servers on the same network.

For example in one embodiment, an on-board GPS unit uploads information (eg. via a hub 153) about a vehicle v1, v2 . . . vn to a central host system 208. Information about the vehicle derived from the GPS information can be presented as a graphic user interface to a user on a display device 151, for example, as a layout shown in FIG. 2.

Figure 2:
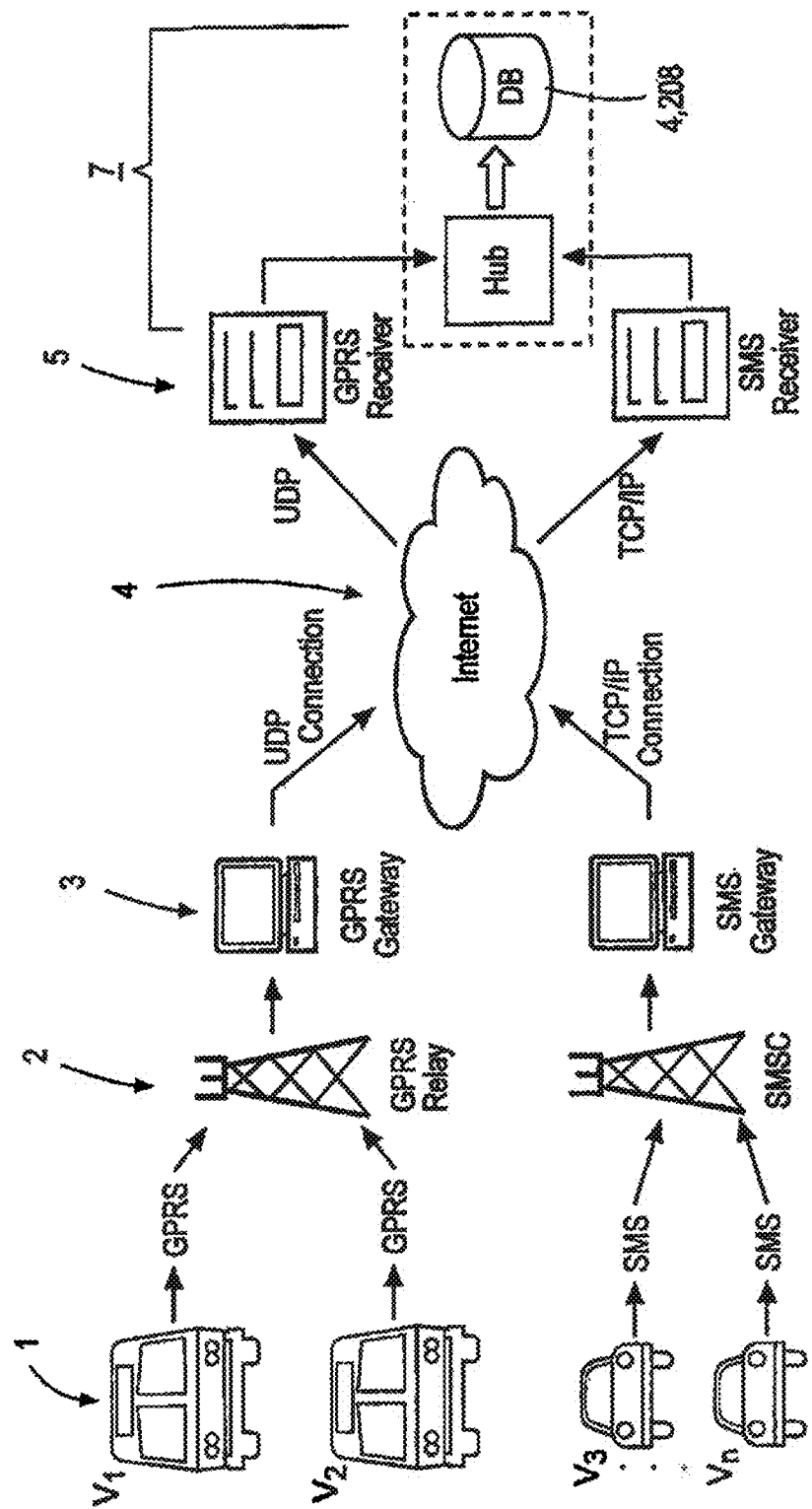
FIG. 2 depicts a representative GPS system.

In one embodiment, the system is programmed at least to receive GPS event data recorded by a GPS (Global Positioning System) device, for example, using an on-board unit which uses technology such as GPS to monitor a vehicle's positions and transmit wireless uploads to a central host system. Referring to FIG. 2 a vehicle tracking system comprises on-board units 1 in vehicles v1, v2, v3 . . . vn, which communicate wirelessly via mobile networks 2 to gateways 3. In this diagram two wireless protocols are indicated, namely GPRS and SMS. However there are typically a variety of additional protocols. The gateways 3 communicate using protocols such as UDP and TCP via the Internet 4 with a host system 7 having receivers 5 which are operating system services, and a data storage system 208. The incoming data is written from the receivers 5 to the data storage system 208, which includes a communication hub 153 and database 208. GB2345824 and U.S. Pat. No. 7,388,518 describes such systems and methods therefor, the entirety of each of which are incorporated by reference herein.

Figure 1C:
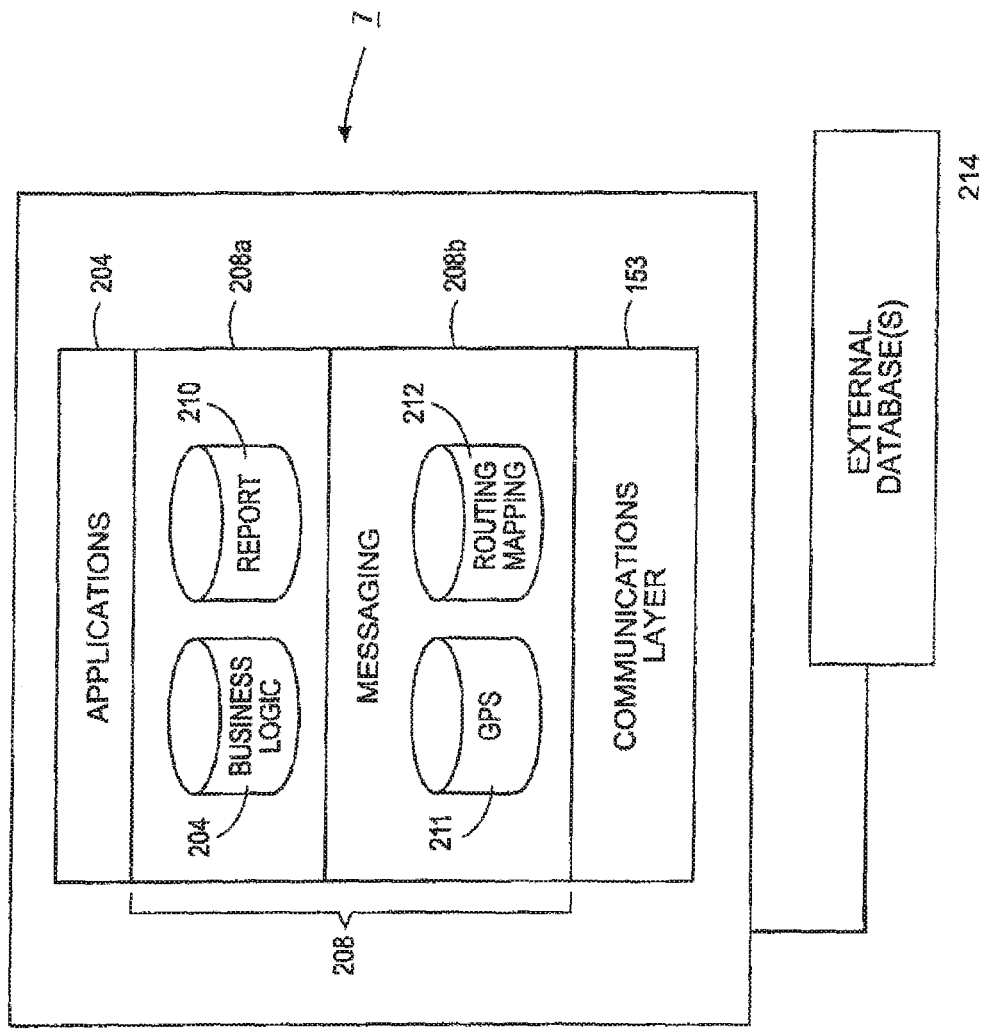

FIG. 1C is a block diagram of a host system 7 showing an exemplary system configuration for a host system 7. As shown therein, a communications layer 153 is operable to receive incoming GPS data and write data from the receivers 5 to the data storage system 208. The data storage system can be divided into any number of databases and logical layers for data analysis and storage. For example, a messaging layer 208b can be configured to store GPS event data from GPS on-board units 1 in a GPS event database 211. A separate routing database 212 could be provided to store mapping and route data based on, inter alia, GPS data to store routes traveled by vehicles. Another database layer 208a can include a business logic database 204 and a reporting database 210 to store rules for analysis of data and reports analyzed data respectively.

A database layer 208b can be operably connected to other databases, for example external databases 214. For example the system can be operatively connected to at least one speed database including mapping data.

For example, an external database 214 can provide mapping data, which can be used in conjunction with GPS data 211 and business logic 204 to identify or create reports as to frequent stop locations. An applications layer 214, such as an application sever 204, can be used to run applications processing, which may include, for example, sending data to and/or receiving data from one or more other data sources such as client workstations, as described above. For example the application layer 214 can be used to provide a graphic user interface 151 of a client workstation 184,190 a user-interactive interface.

In another example an external database 214 can provide mapping data which provides data for addresses and mapping.

An applications layer 204, such as an application sever 204, can be used to run applications processing, which may include, for example, sending data to and/or receiving data from one or more other data sources such as client workstations 184, 190, as described above. For example the application layer 214 can be used to provide a graphic user interface 151 of a client workstation for a user-interactive interface.

In one embodiment, a system is configured to received, store, and process GPS data to provide to a graphic user interface of a client a user-interactive interface for tracking and reporting on vehicles and vehicle fleets. For each vehicle, GPS event data is stored for over an operation period. For example, the data can be stored and processed to show event data for at least one vehicle v for an operation period of a workday, a week, a month, a quarter, a year, the life of a service contract, or any desirable time period. The GPS event data can then be analyzed to derive a plurality of operational metrics for each vehicle. Exemplary operational metrics that can be derived from GPS data include: engine on/off, stop duration, vehicle mileage, idling, number of stops, distance travelled, and speed (including high speed and average speed). For example, an on-board GPS device can be configured to be operational to transmit when a vehicle engine is on, thus engine on/off time can be derived. Idling (stopped while engine running) and speeding (distance/time), as well as vehicle mileage can also be derived from tracking via GPS. This data in turn can be used to derive a number of other operational metrics, including vehicle activity over a predetermined time period, vehicle operational reports, employee performance (e.g., working hours, deliveries per day), driver behavior (e.g.: speeding violations, idling over limits), and fleet performance (e.g., metrics based on data above derived for multiple vehicles). Accordingly any number of operational metrics can be derived from GPS data, either alone or in conjunction with data from other databases, including number of stops per vehicle, duration of stops, performance against a criterion, employee performance, driver behavior, and fleet performance, speeding severity, a speeding violation, average vehicle speed, vehicle speed versus a posted speed limit, vehicle speed versus a speed threshold, and an average road speed for a fleet or driver speed for a route versus average road/traffic speed for a route. A graphic user interface can be configured to display including a representation of at least one operational metric for each of a plurality of vehicles.

Figure 3A:
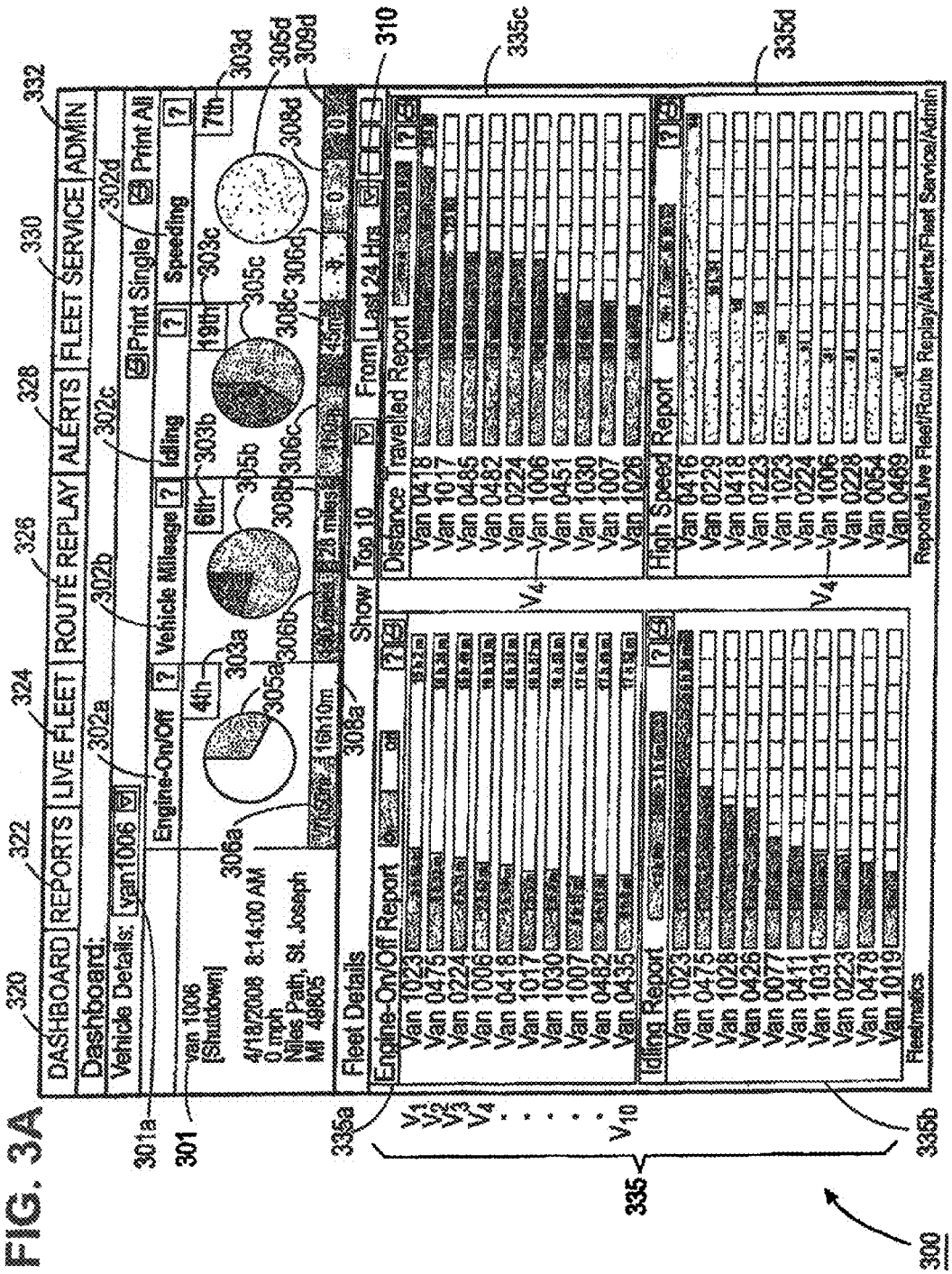
Figure 3C:
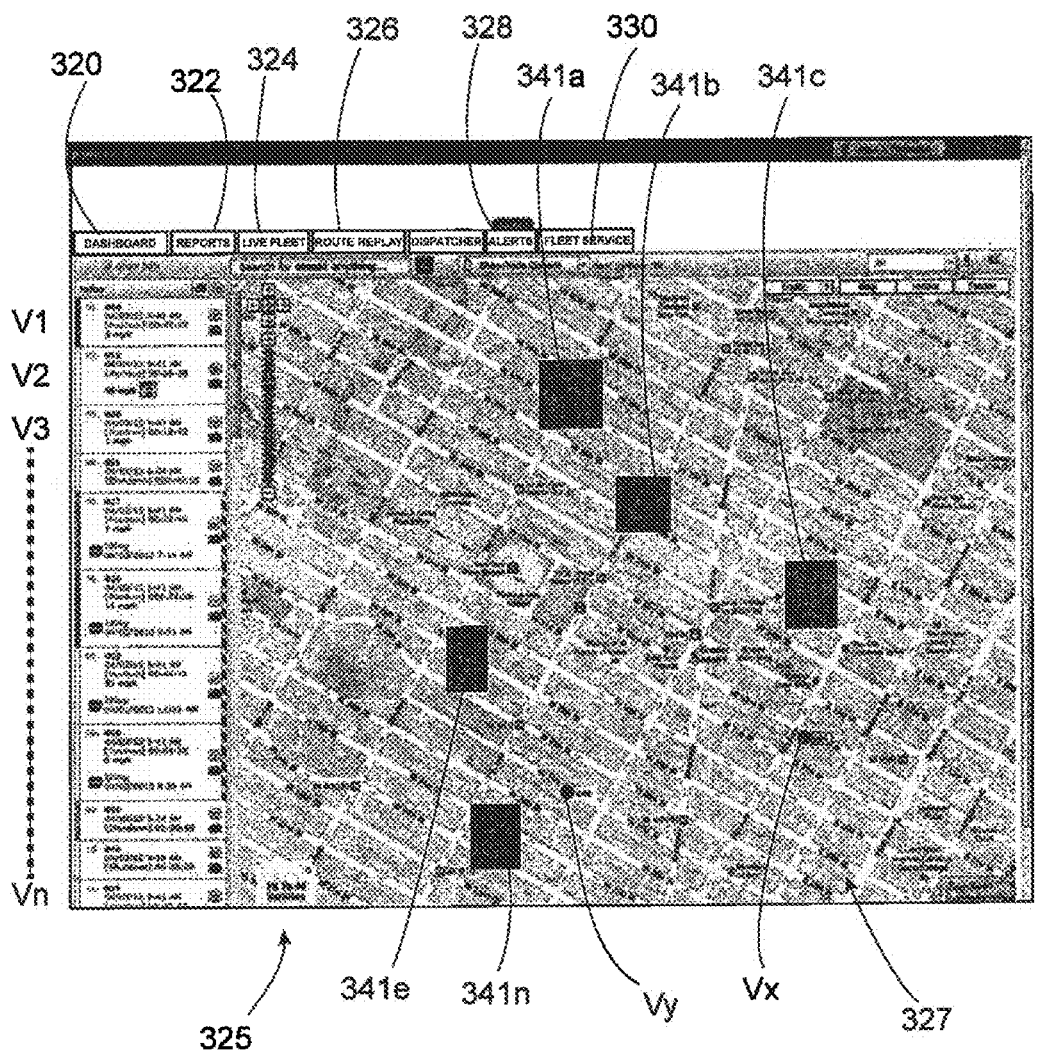

Exemplary graphic representations or interfaces 300 for a graphic user interface for a user is shown in FIGS. 3A-3C. Such interfaces could be in the form of application software for computer and digital devices as described above, or in the form of webpage accessed by a client from at least one host server, or any combinations thereof as broadly disclosed herein and without limitation. As shown in FIG. 3A, a "Dashboard" 320 page gives a user a first interactive screen to view GPS data and operational metrics. The top of the graphic user interface 300 has, in one embodiment, tabs for "Reports" 322, "Live Fleet," 324 "Route Replay," 326 "Alerts," 328 Fleet Service," 330 and "Admn" 332, which lead to other user interactive displays. Of course any number of tabs or links could be configured for the features as described herein, for example for "Speed" "Trending," "Score Card," and/or a "MyFleetmatics" or "My Fleet" page which can include user configurable fleet statistics and alerts, or can have default statistics personal to a user, or some mix of user configurable and default features and statistics.

For example, as shown in FIG. 3C in one embodiment a user can select "Live Fleet" 324 using an input such as a keyboard or a mouse, which would lead to a page with GPS data and mapping software which tracks vehicles v1, v2 . . . vn. The page can allow a user such as a dispatcher to, for example, locate and dispatch the closest vehicle to any job site and reroute the nearest vehicle.

The Dashboard 320, as with any other screen, can be configured to offer preset modules or objects for a user to interact with or view, or in the alternative it can be configured to allow a user to customize the information, reports, alerts, etc most important to the user.

As shown in FIG. 3A, the Dashboard 320 screen includes various graphic representations of operational metrics, including reports and alerts, to aid a user in, among other things, vehicle, employee, and fleet management. For example, the operational metrics 302 for individual vehicles include operational metrics such as a engine on/off 302a, vehicle mileage 302b, idling, 302c, and speeding 302d. Other operational metrics could also be shown such as average speed, number of stops, speeding severity, and speeding violations. The Dashboard 320 shows at the top of the interface 300 a graphic information display for an individual vehicle 301, which can be selected from a drop down menu 301a. Other methods of selection can be used, for example, by selecting with a mouse, a graphic for the vehicle v4 (shown as "Van 1006") in a fleet report graphic 335. The graphic information display for the vehicle 301 includes a reporting and alerts for the vehicle v4, for example, operational metrics such as at least one engine on/off graphic 302a, vehicle mileage graphic 302b, idling graphic 302c, and a speeding graphic 302d.

As shown, the graphics 302a, 302b, 302c, 302d on the individual vehicle 301 is shown reporting graphic that shows a rating 303 under each operational metric comparing the vehicle performance against other vehicles in the fleet for a 24 hour period. For instance, an engine on/off rating graphic 303a puts the vehicle v4 in 4$^{th}$ place in the fleet, a vehicle mileage rating graphic 303b puts the vehicle v4 in 6$^{th}$ place, idling rating graphic at 303c at 19$^{th}$ place, and a speeding rating graphic 303d puts the vehicle v4 at 7$^{th}$ place.

The interface 300 also provides, for the graphic user interface, an alert when an operational metric for a vehicle exceeds a predetermined threshold established for the operational metric. For example, report graphic on the individual vehicle 301 shows the name of the driver, that the vehicle has shutdown (e.g.,: for the end of the workday), the time for shutdown, and for each of the operational metrics, a pie chart graphic 305a, 305b, 305c, 305d, and a split-window graphic 306a/308a, 306b/308b, 306c/308c, 306d8/308d8/309d for the individual's engine on/off, vehicle mileage, idling, and speeding graphics respectively, each of which are designed to alert and report to a user when a vehicle has exceeded a predetermined criterion such as a predetermined threshold. Each of the pie charts 305 and split window graphics 306/308 show the time the vehicle spent within threshold 306, as well as a representation that alerts when the vehicle exceeded the threshold. For example, each metric has in the split window graphic 306/308 a predetermined criterion or threshold 306 established for the 24 hour period: 8 hours for engine on/off 306a, 150 miles for vehicle mileage 306b/308b, 1.0 hours for idling 306c/308c, and three speeding thresholds of over 70 mph, 80 mph, and 90 mph under speeding 306d8/308d8/309d.

For example, the "Engine On/Off" split window 306a/308a has in a left-hand window, for vehicle operation within the predetermined threshold 306a, a graphic which includes a color (green) and text describing the vehicle's v4 operation statistic under the threshold, 7 hours, 50 m. The right-hand window 308a, shows a window with the time remaining in the 24 hour period (16 hours, 10 min.) Because this is time where the engine was not running, and thus within the threshold, the window 308a is configured to show neutral color or identifier (e.g. white, tan, clear). The pie chart 305a shows a visual with green and neutral coloring corresponding to the times in the split window 306a,308a which allows a user to readily visualize the percentages for the Engine On/Off time.

The "Vehicle Mileage" split window 306b/308b shows the predetermined threshold of 150 miles in the left-hand window 306b, which is in green as with Engine On/Off. However, the right-hand window 308b shows the driver has exceeded the threshold by another 28 miles. As this is in excess of the threshold, where the window 308b is configured to alert the user with a red color. The pie chart 305b shows a visual with green and red coloring corresponding the times in the split window 306b, 308b which allows a user to readily visualize the percentages for the vehicle mileage, as well as alert the user that the vehicle is excess of the threshold.

The Idling and Speeding graphics are similarly configured, thereby proving a user friendly view for all the metrics for the individual vehicle and driver. For example, Idling 302c includes an alerting threshold where of 1 hour, and alerts for excess of an hour of idling. Speeding 302d includes reporting and alerting for, among other things, speeds in excess of 70 mph 306d, 80 mph 308d, and 90 mph 309d, with different colors for each (e.g. green, yellow, and red).

It will be understood that other graphical displays could be used, such as bar graphs, gauge icons, whimsical graphics (e.g., a speedometer or a stopwatch), or any other such graphic as is useful.

For each vehicle v1, v2, v3 ... vn, historical GPS event data can be stored, as for example, for a plurality of operation periods. Accordingly, while the graphics 302a, 302b, 302c, 302d on the individual vehicle 301 are over an operational 24 hour period, the graphics could be configured to show data for longer periods and/or a plurality of operational periods, such as a week, a month, a quarter, a year, or other periods as desired. Other thresholds could be implemented for each of these periods, as for example, by adding the criteria or thresholds for each operational period, e.g., for Vehicle Mileage 302b, or an 160 hour threshold for a 4 work-week period (a five day week), where each 24 hour period is 8 hours. Other reports can be generated based on the historical event data.

For example, report information can include one or more reports on: frequent stop locations or "Hotspots," vehicle activity over a predetermined time period, speed (including high speed and average speed), number of stops, idling, vehicle operational reports, maintenance, employee performance, driver behavior; and fleet performance.

An exemplary, selectable "Top 10" fleet report 335 shows reports 335a, 335b, 335c, 335d for the top ten vehicles in each of operational metrics for a fleet of vehicles: Engine On/Off 335a, Distance Traveled 335c, Idling Report 335b, and High Speed Report 335d. As noted herein additional metrics for "Speeding Violations and "Speeding Severity" can be added to the reports relating to speed. Operational metrics for one of the vehicles v4, "Van 1006" is shown at the top of the graphic user interface 301, and the vehicle rankings as shown for v4 are shown in three of the metrics 335a, 335c, and 335d where the vehicle is in the top 10, as described above. While the report shows the "Top 10," a selectable drop down menu 311 allows a user to select any number of options for reporting (e.g., top 20, 50) and another drop down menu 310 allows a user to select time periods (e.g. 24 hours, 5 days, a month), to obtain ranked vehicle performance for the fleet and vehicles therein.

The "Engine On/Off Report" 335a ranks the vehicles v1 ... v10 from highest to lowest for "Engine On" time over the 24 hours. For example, a row for the top vehicle v1 shows the engine was on for 9 hours and 58 minutes and off for 15 hours and 2 minutes. The lowest ranked v10 (Vehicle 0435) shows engine operation for 6 hours and 8 minutes, whereas the off time is 17 hours and 52 minutes. A fillable bar graph shows on and off times, with "on" being green and off being blank or neutral, with the fill line visually showing the percentage of the 24 hour period. Text graphics write out the time. The rows of bar graphs for each vehicle are aligned in a columnar format so as to readily compare each vehicle's statistics with one another.

The "Distance Traveled" 335c reports and alerts are consistent with criteria for the "Vehicle Mileage" 302b for the individual driver described above, and ranks vehicles within the top 10 of the fleet from highest to lowest for distance traveled. A fillable bar graph shows the predetermined threshold of 150 miles in the left-hand bar graph, which is in green. However, the left-hand of the bar graph shows, with fill lines by percentage, where the driver has exceeded the 150 miles threshold. The top ranked vehicle of the fleet is in excess of the threshold by 234 miles, whereas the 10$^{th}$ ranked vehicle (Van 1026) is only a few miles over. A fillable bar graph shows distances times, with the 150 mile threshold being green any excess mileage being red so as to alert the user, with the fill line visually showing the percentage of the 300 mile distance. Text graphics write out mileage at or under 150 miles on the left-hand side, and mileage in excess right hand side. Again, rows of the bar graphs for each vehicle are aligned columnar format so as to readily compare each vehicle's statistics with one another. The "Idling" 335b and "High Speed" 335d reports graphics are similarly configured, thereby proving a user friendly view for all the metrics for the ranked vehicles and drivers in the fleet. For example, "Idling" 335b includes an alerting threshold of 1 hour, and reports, bar graphs, alerts for excess of an hour of idling. A report (not shown) can also be configured in a format for delivery to a PDA or smartphone, which shows bar graphs, rankings, and idling times for a plurality of drivers/vehicles over a 24 hour period.

FIG. 3B shows another example of a detailed report, as could be accessed, for example, in a page from the "Reports" (see FIG. 3A 322). The report is a "Hotspots Report" 350 for providing, for a graphic user interface, a representation including a representation of the frequent stop locations called "Hotspots," as shown in the lower table 340 portion of the graphic user interface. The graphic user interface, a representation comprises at least one of a geographic criterion for at least one frequent stop location, a time period criterion for at least one frequent stop location, a rank order; and a distance.

An upper window 342 includes an area for selecting a time period 345 for the report, selecting the number of frequent stop locations 346, selecting a distance for flagging nearby or associated frequent stop locations 347 and a selecting a geographical criterion 348. In one exemplary embodiment the time period criteria can be configured as follows:

Start Month 345a—defaults to the previous month. If it is the middle of a month, then the system will show the previous month. (e.g.: If today's date is February 15th, then the system will load January by default.)

End Month 345b—defaults to the previous month; if it is the middle of a month, then the system will show will show the previous month. (e.g.: If today's date is February 15$^{th}$, then the system will load January by default.)

Other criteria for the report include:

Show top (number) Hotspots 346. The dropdown menu can be configured to show a predetermined number of frequent stop locations, for example: 10, 20, 50, 100, 200 or 500.

Flag POI's within (KMs/Miles) 347. The dropdown menu can be configured to show a predetermined number of POIs (a user identified "Point of Interest") within a given radius of a frequent stop location, for example –0.1, 0.2, 0.5 or 1.0.

Geography 348. The dropdown menu can be configured to show dropdown listings for predetermined geographical areas, for example, states in the United States of America.

The system can be configured to run the report once a user has selected the criteria for the report, for example by presenting an interface input 351 for to run the report. In the embodiment, the GUI presents a Summary of the criteria for the report in a summary area 352 which shows the selected criteria for Start Month, End Month, Top (number) Hotspots, Flag POIs within (KMs/Miles), and Geography.

Each location is given a row 340a, 340b, 340c, 340d, 340e, 340f, 340g, 340e on the report, and the table 340 which includes columns for a frequent stop location ("Hotspot") address 343a, overall rank 343b, number of visits ("# Visits") 343c, number of vehicles making the stops 343d, average stop duration 343e, average arrival time 343f, average travel time 343g, average distance travelled 343h, and a frequent stop location name associated with or nearby the location 343i.

Hotspot Name 343a—the address of the Hotspot. The "Hotspot" address 343a includes the address identified and stored as a relevant address for an automatedly identified frequent stop location as described herein. In an embodiment, the address does not include any street/house numbers. This applies when saving frequent stop location "Hotspots" as described below with respect to FIGS. 4-7. In one embodiment, the address can be configured as a link with an additional [+] symbol load Hotspot details (see FIG. 3D). The frequent stop locations are ranked in order from highest to lowest for a time period selected in the upper window, with the highest ranking visit being 350 visits 344a, the second highest below that at 300 visits 344b and so on to the lowest rank of 50 visits 344g. The report includes:

Overall Rank 343b—displays the Hotspot's overall ranking (regardless of date range). Ranking is based on a total number of stops as described herein. As will be noted, the overall rank 343b of the frequent stop location may be different than that of the selected period selected in the time area 345 or other criterion for the report as described below.

Visits 343c—the number of times the frequent stop location stop was visited during the selected date range. It will order the results. A graphical representation will display beside the number in descending order. The "# Visits" includes a bar graph 344a, 344b, 344c, 344d, 344e, 344f, 344g which shows a colored fill bar and text showing the number of visits.

Vehicles 343d—the number of unique vehicles that visited the frequent stop location.

Avg. Stop Duration 343e—average time vehicles spent at the stop (shutdown duration to Startup).

Avg. Arrival Time 343f—average time vehicles arrived at the stop (shutdown).

Avg. Travel Time 343g—average time it took vehicle to get to the stop (last startup to shutdown).

Avg. Distance Travelled 343h—average distance covered to get to Hotspot.

POIs 343i—displays nearby POIs—a user identified "Point of Interest" saved by a user—based on the "radius selected" 347. In an embodiment the system is configured to show the top 3 POIs near a Hotspot. For example, a POI within 0.1 miles of a Hotspot would generally correlate with the address of automatically derived frequent stop location identified as a Hotspot using embodiments described herein, although in certain instances multiple frequent stop locations may correlated with a single address, as for instance where many businesses or people occupy the same building and have the same address. However, the criterion can be set to cover different distances to correlate to addresses in the region where stops are being made by vehicles. In another embodiment, the system can be configured to use a stop as a seed, and can list not only the POIs associated with the automated frequent stop location, but also other nearby addresses (for example, from an external database).

The report could also be configured to include has alerting icons (not shown), which show exceptions, for example where an average stop duration or average arrival time have exceeded predetermined thresholds or criteria.

The system can also be configured to provide mapping and tracking functions, as described above. The system can be configured to interface with mapping systems, for example, such as Google Maps (http://maps.google.com/maps), www.mapquest.com, www.mapsonus.com, www.maps.expedia.com, www.maps.yahoo.com (accessed through www.yahoo.com), www.maps.com, www.maps.excite.com, (accessed through www.excite.com), and www.mapblast.com, and www.bing.com\maps. Also see U.S. Pat. Nos. 4,974,170, 5,682,525 and 6,148,260, the entirety of each of which is incorporated by reference herein.

Figure 1D:
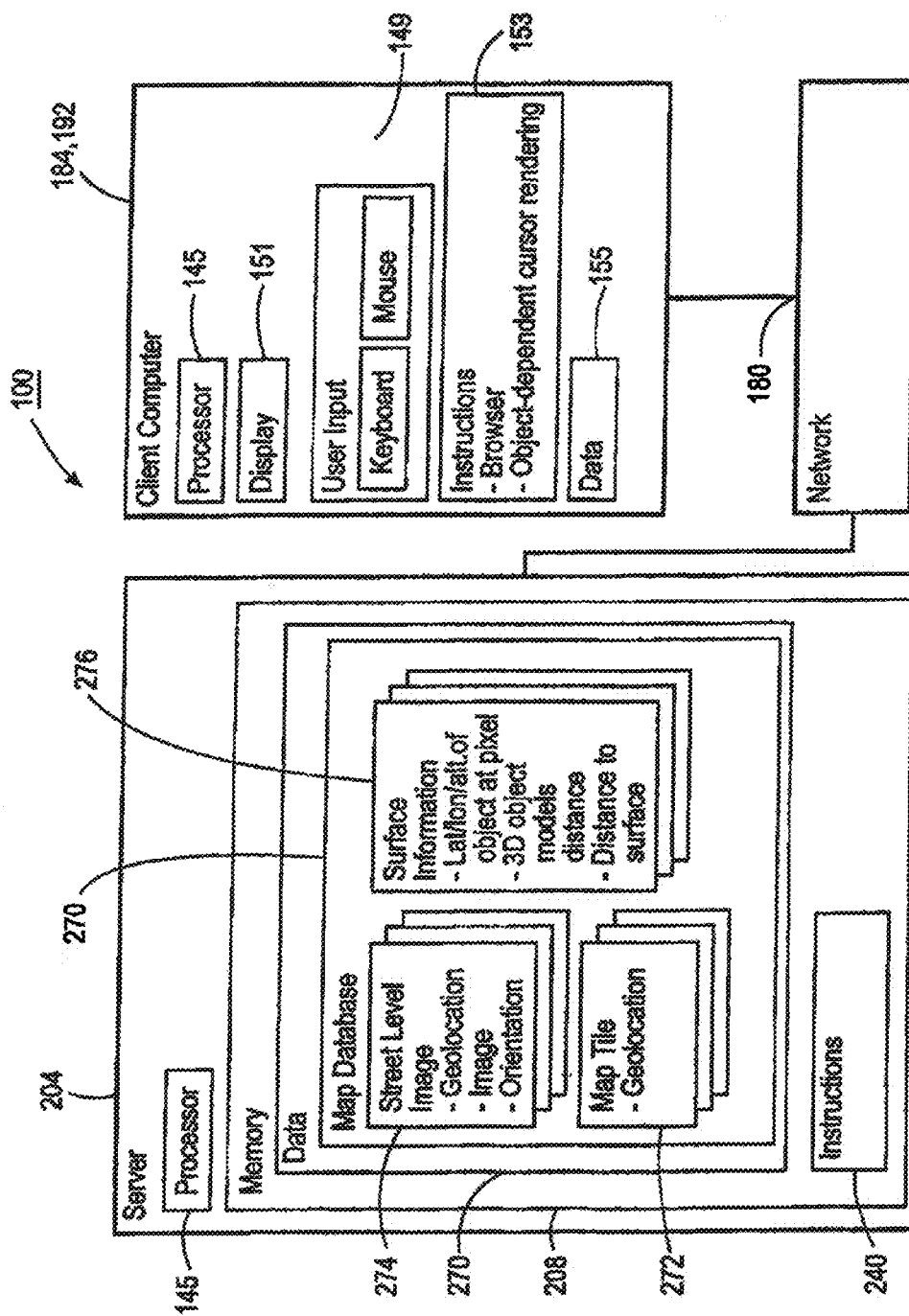

In one embodiment, a map database 270 of server 204 stores map-related information 272, 274, 276 at least a portion of which may be transmitted to a client device 184,192. As shown in FIG. 1D, for example, map database 270 may store map tiles 272, where each tile is a map image of a particular geographic area. Depending on the resolution (e.g., whether the map is zoomed in or out), one tile may cover an entire region such as a state in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 204 is capable of selecting, retrieving and transmitting one or more tiles in response to receipt of a geographical location.

As noted below, the locations may be expressed in various ways including but not limited to latitude/longitude positions, street addresses, points on a map (such as when a user clicks on a map), building names, other data capable of identifying one or more geographic locations, and ranges of the foregoing.

For example, as shown in FIG. 3C in one embodiment a user can select "Live Fleet" 324 using an input such as a keyboard or a mouse, which would lead to a page 325 with GPS data and mapping software which tracks vehicles v1, v2 . . . vn. The page 325 can allow a user such as a dispatcher to, for example, locate and dispatch the closest vehicle to any job site and reroute the nearest vehicle. The "Live Fleet" page 325 can be configured to show a map 329 on a graphic user interface which can be "zoomed" to higher and lower levels using interface icons 327. As a user zooms into the map 329, i.e. at a city level or closer, the graphic user interface is configured to display icons or graphics 341a, 341b, . . . 341n, showing frequent stop locations on the map, for example as bounding boxes based on the embodiments for defining an area identified as a frequent stop location as described herein. As the user zooms closer in the icons get bigger, and as the user zooms out the icons get smaller, but more Hotspots can be shown due to the larger coverage of the map area.

Figure 3D:
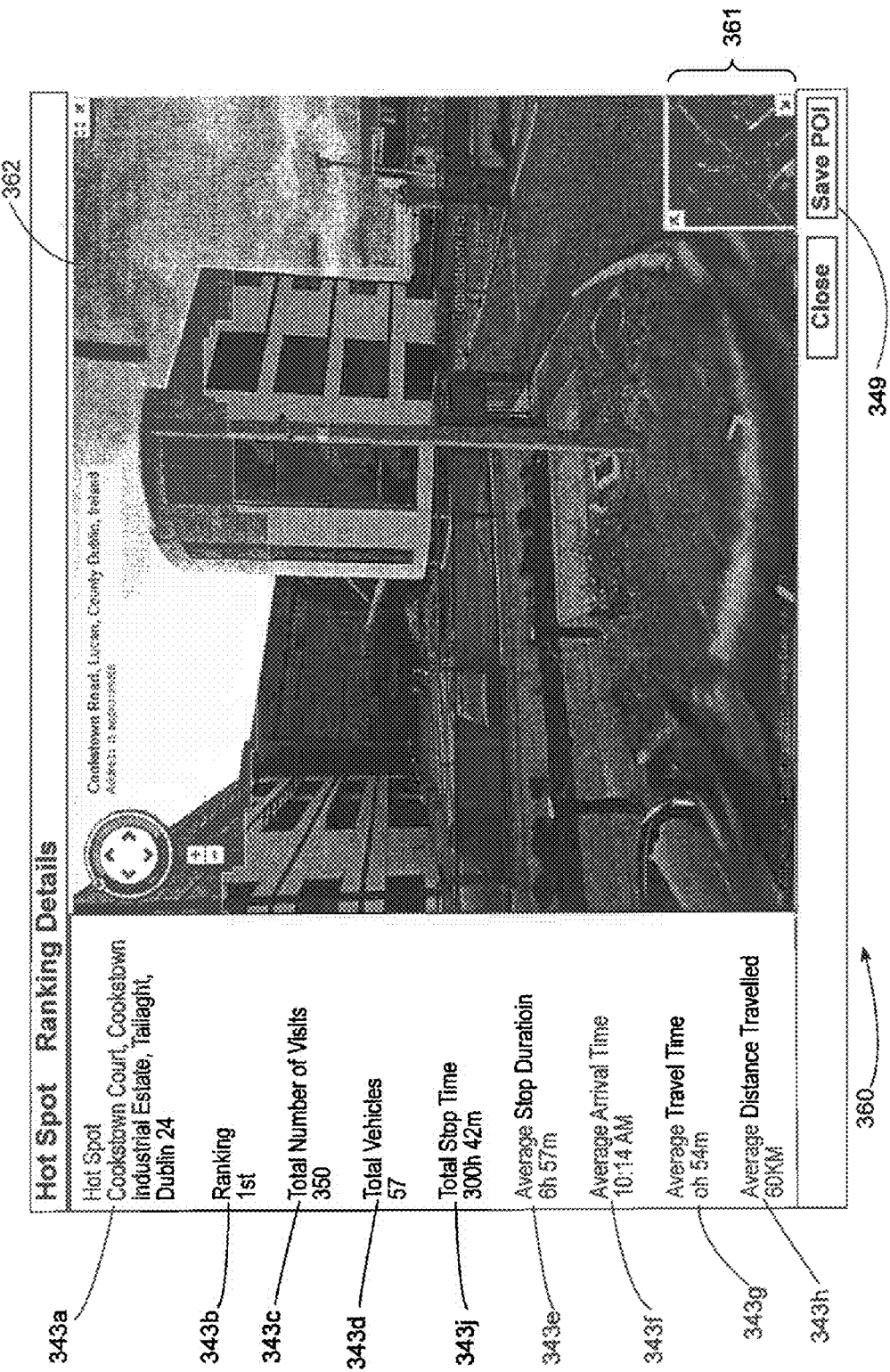

As shown in FIG. 3D a representation 360 of the frequent stop location for a graphic user interface, can also include a map of the frequent stop location, including a ground level view of the frequent stop location. For example, a link or other interface input for a selected frequent stop location 340a from the table 340 of the "Hotspots" report 350 or a frequent stop location graphic 341a . . . n on the map from the Live Fleet page could present a user with a page or a pop-up graphic 360 including a map 361 and ground level view 362 of the frequent stop location. As will be noted, any page listing or otherwise referencing a given frequent stop location or Hotspot could be configured to link or present the frequent stop location page or pop-up 325. The interface can also be configured with an interface input area 349 to allow a user to manually designate and save the automated frequent stop location "Hotspot" as a user designated POI in the system (i.e., independent of stop events used to identify and rank automatedly determined frequent stop locations as described herein). The graphic also includes details for reporting on the frequent stop location, including a frequent stop location address 343a, rank 343b, total number of visits ("# Visits") 343c, total number of vehicles making the stops 343d, average stop duration 343e, average arrival time 343f, average travel time 343g, average distance travelled 343h, as well as a total stop time for the frequent stop location 343j. As will be noted, in an embodiment these report details can be configured to show overall totals for the frequent stop location as opposed to those filtered by a time criteria in FIG. 3B, although options for reporting within filter criteria can be programmed as well.

Still other reports based on GPS data and tracking could be provided, such as driving behavior including vehicle speed, engine start-up and shut-down and idling time, or any others including as described herein which can be used to enforce driving policy and curb unwanted behavior like excessive speeding, tardiness and extended vehicle idling.

Figure 3E:
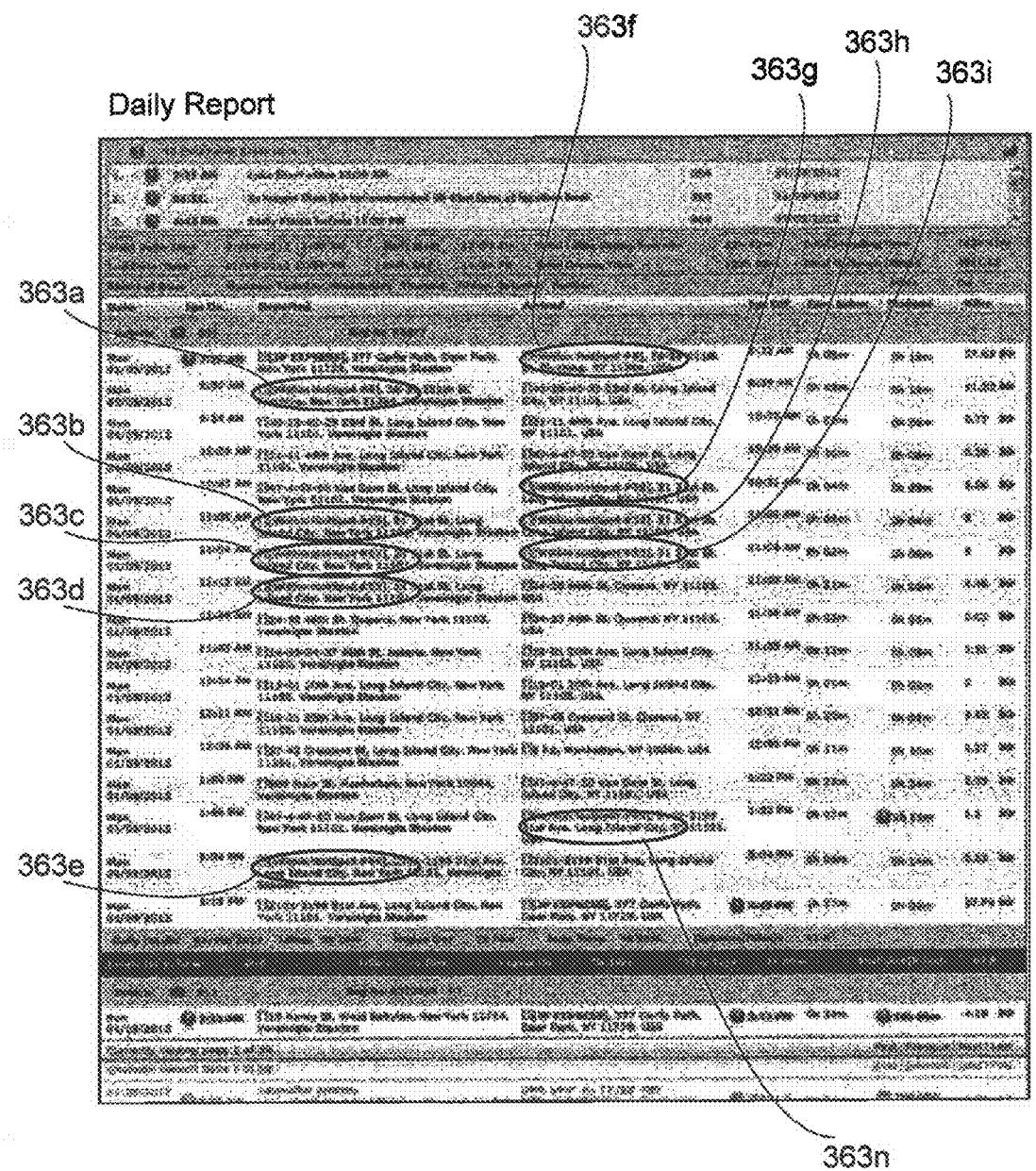

Alerts can be flagged in relevant reports, and users can also be notified of any alerts as soon as a violation occurs via email or mobile device. It will be noted that in some embodiments, a portable device such as a smart phone or PDA can be configured to receive alerts that need urgent attention, such as an off-hours use alert or an alert indicating rerouting is needed. A report can also include an alert for a frequent stop location or Hotspot. For example, as shown at FIG. 3E, a "Daily Report" for a fleet showing vehicle stops, exceptions, and a log of stops for a vehicle can be configured to show text graphics 363a, 363b, . . . 363n, an orange text link for instance, by any arrival and departure stops that have been identified as a frequent stop location. As noted above, the graphic 363a . . . n can link to a page or present a pop-up that shows further detail about the frequent stop location as shown in FIG. 3D.

In an embodiment a computer system the GPS event database includes a frequent stop location database including stop event data associated with the vehicles. The system also includes logic for at least one criterion for identifying a frequent stop location. The GPS event data includes location information for the vehicle and stop duration and stop number information, which is stored in the GPS event database. Operational metrics for the GPS event history are derived for, inter alia, a vehicle stop event data, using for example engine on/off event at a location where an engine for a vehicle is shutdown and started up, indicating a vehicle stop. For another example, idling for a predetermined period of time at a location (e.g. a time in the range of at least 5 minutes to at least 30 minutes or more). The operational metrics can include other metrics described herein useable to identify a vehicle stop.

In one embodiment, the computer system comprises: a criterion for GPS event data used for identifying a frequent stop location. As will be appreciated, the embodiments described herein can be implemented such that a computer can automatedly and without human intervention identify frequent stop locations for fleet, referred to herein in various embodiments as "Hotspots," based on vehicle behavior such as vehicle stop data.

Data acquisition is as follows. GPS event data is acquired and stored from GPS devices with vehicles as described herein. GPS event data for the vehicle is associated with a stop event parameter, such as engine on and engine shutoff or engine idling for a predetermined period of time. As will be understood, as more GPS data events are accumulated, accuracy and options for reporting can become more robust as well.

Figure 4:
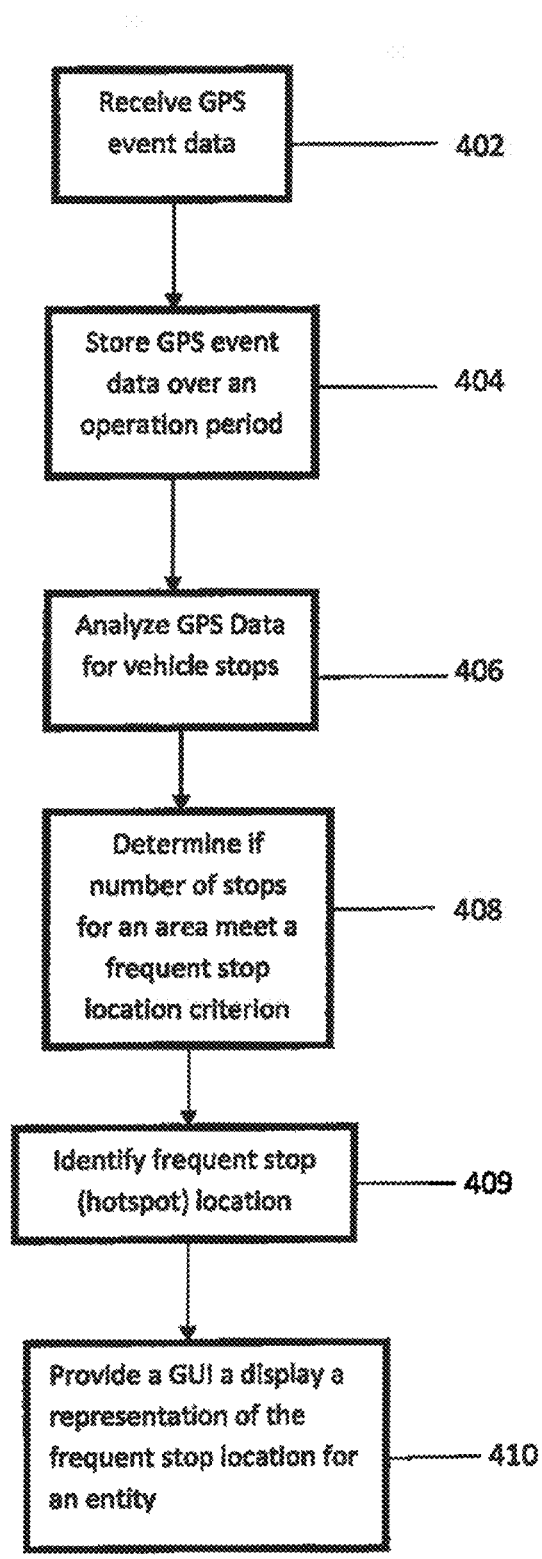
FIGS. 4-7 are flowcharts depicting exemplary processes for automated identification and updating frequent stop locations.

FIG. 4 shows a flow chart for a method and system flow for processing and presenting GPS event data for a graphic user interface, in accord with embodiments as described herein. As shown in block 402, the system receives GPS event data transmitted from a plurality of GPS devices, each GPS device being a vehicle. At block 404, the system stores, for each vehicle, in a memory operatively coupled to at least one of the processors, the GPS event data over an operation period. At block 406, the GPS event data is analyzed to derive a plurality of operational metrics for each vehicle, including analyzing the GPS event data to derive vehicle stops for at least one vehicle. At block 408, the system determines if the number of stops meets a frequent stop location criterion. At block 409, the system identifies at least one frequent stop location based on the vehicle stops. At block 410, the system can provide, for a graphic user interface, a display a representation of the frequent stop location for at least one vehicle associated with an entity, as for example a company or company fleet. As used herein, a fleet or vehicle fleet is understood to refer to any entity (e.g. a business entity) for whom at least one vehicle is being tracked and GPS based data is provided for, including frequent stop locations as described herein.

The method further comprises identifying a stop location for a vehicle. Described is a method to identify a frequent stop location in accord with embodiments described herein comprises recording vehicle stops for an entity associated with the vehicle over a predetermined period of time. For example, stops are collected or processed for a predetermined time period, for example 1-6 months, which act as "seed" stops. In one embodiment the system processes stops for 3 months. As will be appreciated, any time period can be used depending on the type of entity for whom the stops are being used to identify frequent stop locations. If the number of stops meets the threshold number of stops, the area is identified as a frequent stop location.

Figure 5A:
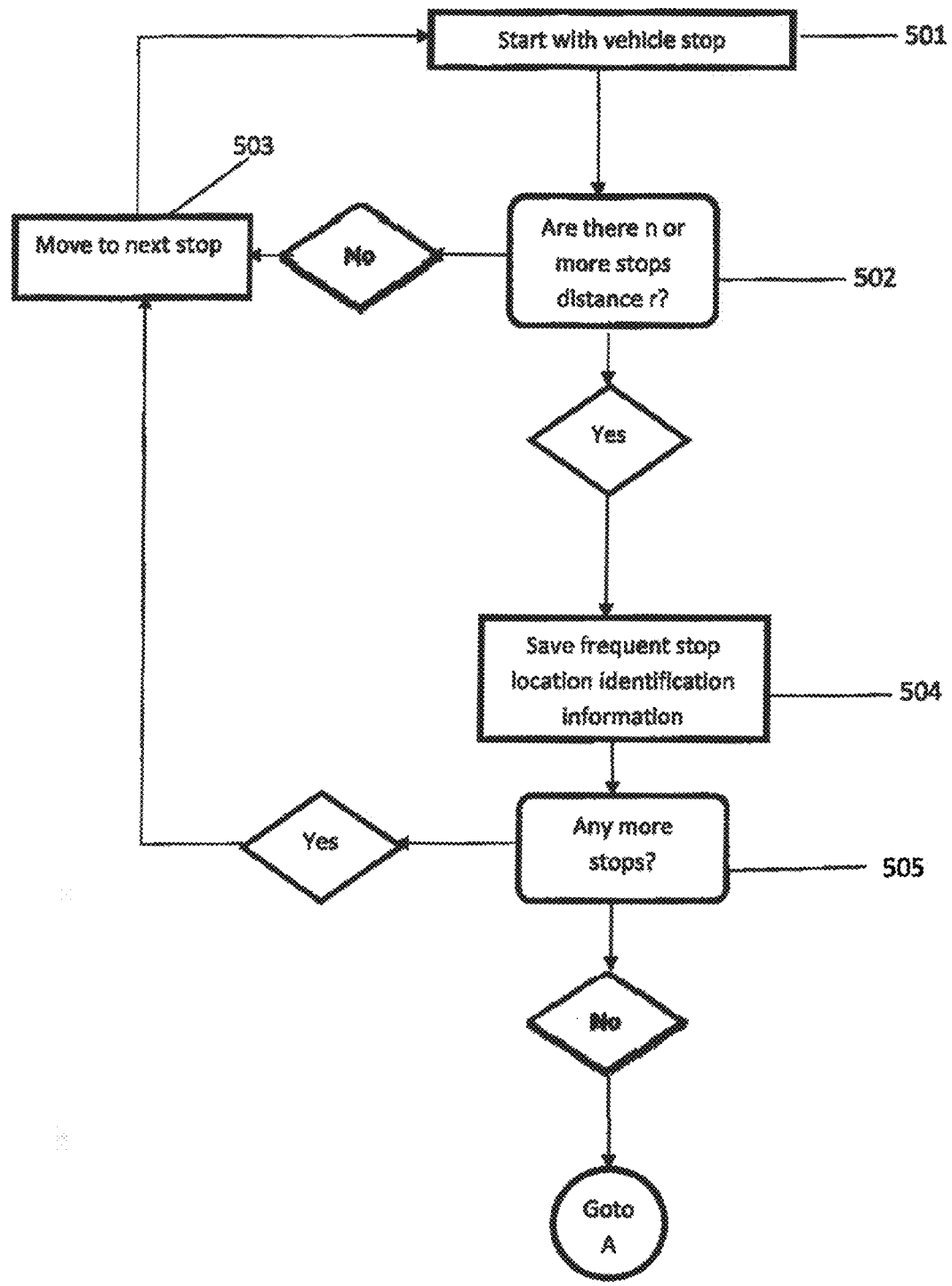
Figure 5B:
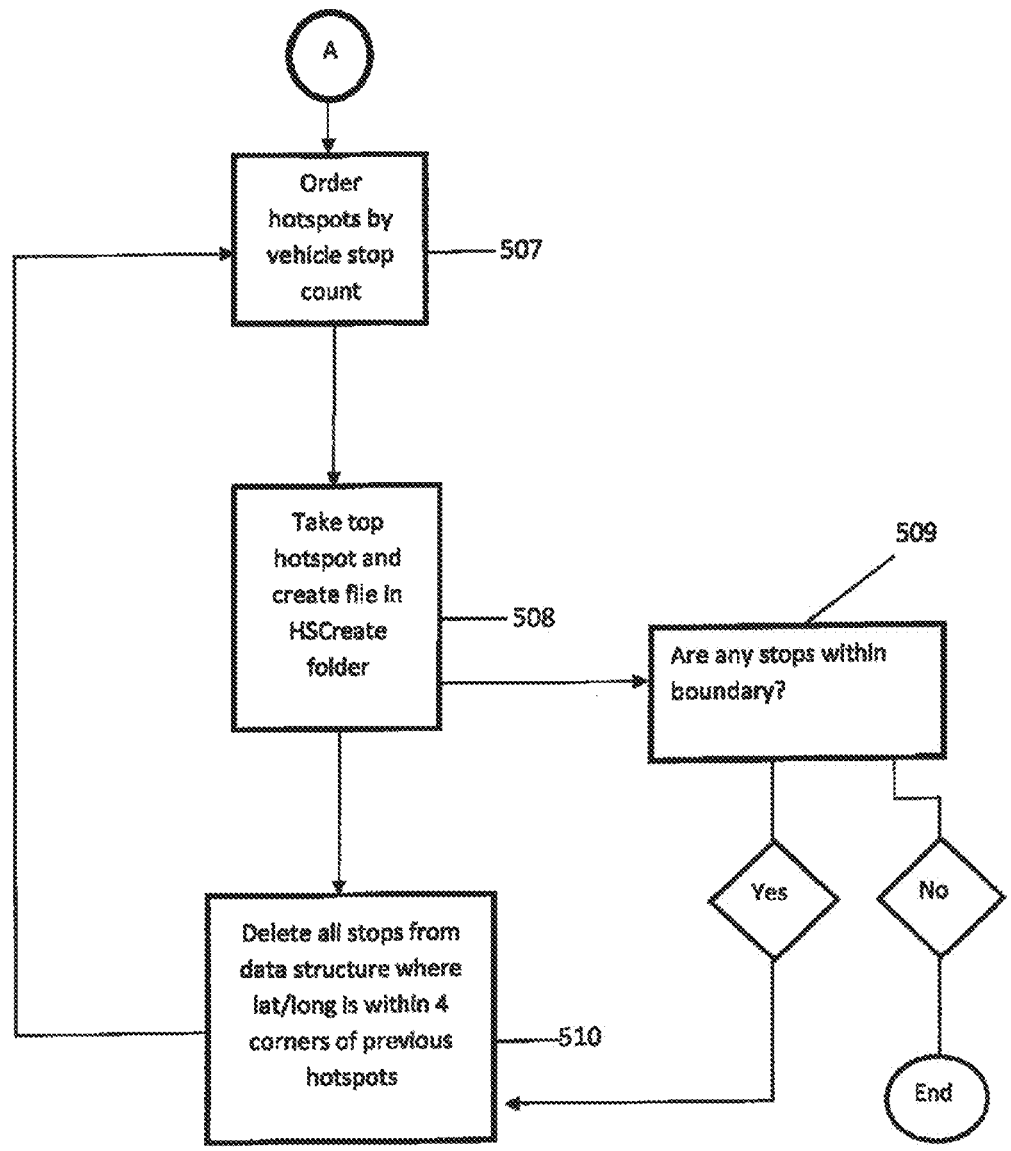

FIGS. 5A-5B shows a flow chart for a method flow for processing GPS event data to identify a frequent stop location in accord with embodiments of the system as described herein. FIG. 5 shows an embodiment, illustrated with respect to an initial determination of frequent stop locations taken first for an entity. At block 501, the system starts with the identified seed stop. At block 502 the system determines if a number of stops meets a threshold number of stops for an area in the time period. In one embodiment the system is configured determine the area as a function of the distance from the stop location of the vehicle. For example the system can be configured to employ a trigonometry function to determine a radial distance around the seed stop, as described below with respect to FIG. 6. The distance can be in the range of a radius of about 0.1 miles to 1.0 miles. In an embodiment, distance is in a radius of about 0.1 miles around the seed stop. As will be understood, the threshold number of vehicle stops can any number of stops over any defined time period, depending on variables such as, for example, fleet size. For example, for a fleet of up to around 200-400 vehicles, stops can be in a range of 2 to 50 stops over a month. However for a much larger fleet, numbering in the thousands or larger, the threshold number of stops can be proportionally or similarly greater, and the time period can be shorter as well. In one embodiment the threshold number of vehicle stops in a range of 5-10, over a defined time period of one to three months.

For example, in making an initial determination of frequent stop locations for a fleet, the threshold number of vehicle stops can be at least 5, and the distance is in a radius of about 0.1 miles. In making an initial determination for seed stops, the system can be configured to use a lower stop number variable for the threshold frequent stop location determination. For example, the while a system may be configured to use 10 stops as a threshold, as described in an embodiment below; at an initial batch the system can be configured to use a 5 stops variable for this data and unlimited frequent stop location per company (i.e., with no limitations on the number of hotspots identified). However, embodiments with a limitation on the number hotspots can be configured as well. For example, in one embodiment the stop events are calculated month by month for Hotspots, which can be extended to a previous number of months (e.g., up to 3 months) for "orphans"—stops that do not yet correlate with a Hotspot.

If the system determines that a stop does not have the threshold number of stops within the area, at block 503 the system then proceeds to the next identified stop to start another analysis for the next vehicle stop 501. If, however, the number of stops does meet the threshold, at block 504 the system saves the stop as a frequent stop location seed stop. At block 505, determines if there are any more stops to identify for the entity. If so, at block 503 the system then proceeds to the next identified stop to start another analysis for the next vehicle stop 501.

If at block 505 the system determines there are no more stop events to analyze, the system proceeds to process the frequent stop location seed stops saved at block 504 as shown in FIG. 5B. At block 507 the frequent stop location hotspots are ordered by stop count, e.g. from highest stop counts per frequent stop location to lowest stop counts per frequent stop location. At block 508, the frequent stop location with the highest number of stop counts is recorded and saved as a file for the frequent stop location.

Next, the system is configured to exclude any stops associated with an identified frequent stop location from being identified a separate frequent stop location. At block 509 the system determines if any stops in the frequent stop location are within the boundaries of a previously identified frequent stop location. If so, at block 510 the system deletes all stops from the data structure that are within the boundaries of the previously identified frequent stop location. The system flow then returns to block 507, where the system reorders the frequent stop locations to run the process again. The system continues the process until it determines there are no further frequent stop locations for the fleet above the required threshold of stops, and further, attributes the stops to each frequent stop location without overlap. The system is thereby configured to run the process to determine all the frequent stop locations for the data structure and create and record frequent stop location files therefor.

Figure 6:
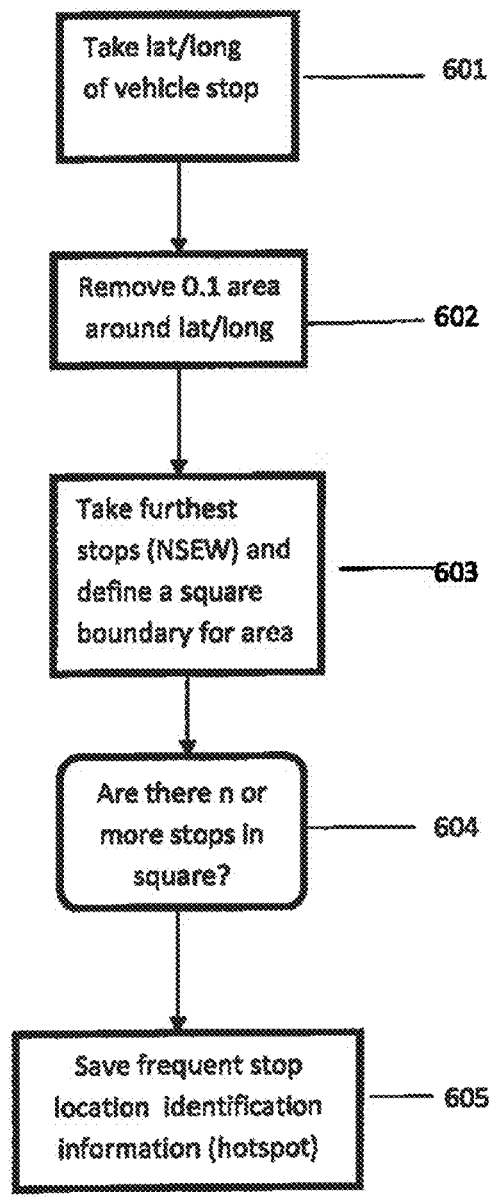

FIG. 6 shows a flow chart for a method and system flow for to implement a trigonometry function to determine a radial distance around the seed stop, as described above. At block 601 the system identifies a stop derived from the GPS data and gets the location data for the stop, for instance, a latitude and longitude for the stop. As noted above, an on-board GPS device can be configured to be operational to transmit when a vehicle engine is on, thus engine on/off time can be derived.

Such events can be stored over time as explained herein (see e.g., FIGS. 8A-8C) and arrival (shutoff) and departure (engine on) times can be logged. At block 602, the system is then configured to take the position for the location and define the area for the frequent stop location. At block 603, the system identifies the furthest outside stops in the remaining area; and defines a boundary shape for the frequent stop location using the furthest outside stops. For example, the system is configured to take the furthest stops, for example (e.g., the outermost stops) in the north, south, east, and west, to define a square boundary. At block 604 the system determines number of stops in the area meets the threshold number of stops for the area. At block 605, the system associates and saves vehicle stop information with the identified frequent stop location, for example location information such as an address. The vehicle stop information can also include a time and an entity identifier, as described herein.

For example, in one embodiment the threshold number of vehicle stops is 10, and the distance is in a radius of about 0.1 miles. Each stop is compared to a 0.1 mile radius to see if there were 10 stops in the vicinity. If there are 10 stops, then the area is identified as a frequent stop location, shown for example as a "Hotspot" in illustrative embodiments herein. The system is then configured to define the area for the frequent stop location, by taking latitude and longitude (0.1) and remove anything that is either side of it. For example, with a lat/long of 75.234, the system removes 75.134 and 75.334. The system is configured to take the furthest stops, for example the outermost stops in the north, south, east, and west as noted above, to define a square boundary. The system is also further configured to record and save the boundaries, a company ID and a Hotspot name, as well as a time stamp. The Hotspot name can be for, example an address plus the Hotspot ID and Time Stamp (when it was created). A total stop count for the Hotspot is also recorded in a database. The total stop count can power a ranking as described herein. The frequent stop location with the highest number of stop counts can be saved as a record in a frequent stop location database for the frequent stop location, for example in an "HSCreate" folder.

As noted above, the system can be configured rank a plurality of frequent stop locations. The system is configured to determine a total number of recorded vehicle stops for each of the plurality of frequent stop locations; and ranking the frequent stop locations by the total number of recorded stops in each frequent stop location.

The address can comprise, for example, a relevant or targeted address that is relevant to the frequent stop location. An identified frequent stop location may have a number of addresses associated with it. In one embodiment, the system is configured to determine if there is an address for each latitude/longitude identified as a frequent stop location. For example, the system may employ a reverse geocode, which is a process of back (reverse) coding of a point location (latitude, longitude) to a readable address or place name, as known in the art. For each frequent stop location, the system performs a comparison to see which address is determined the most. The system can then be configured to use the address for the Hotspot name. In another embodiment, the system is configured to identify the most central prevalent address. For example by series of stop points in a bounding box for a frequent stop location as described herein, the system can be configured to obtain the average lat/long—which for a grouping of points may not be a center point for the box. For a concentration of points in an area of the box, an average lat/long it taken and the stop point closest to that average lat/long-point is identified as the most relevant address for the frequent stop location. This stop can be identified as a prevalent stop in addition to the identified stop's latitude/longitude. In one embodiment, the record stored in a frequent stop location database can have a format configured in accord with the frequent stop location information, for example "[Hostpot pk_id, 4 corners (min and max lat/long), timestamp, most prevalent address, and relevant lat/long]"

Figure 7:
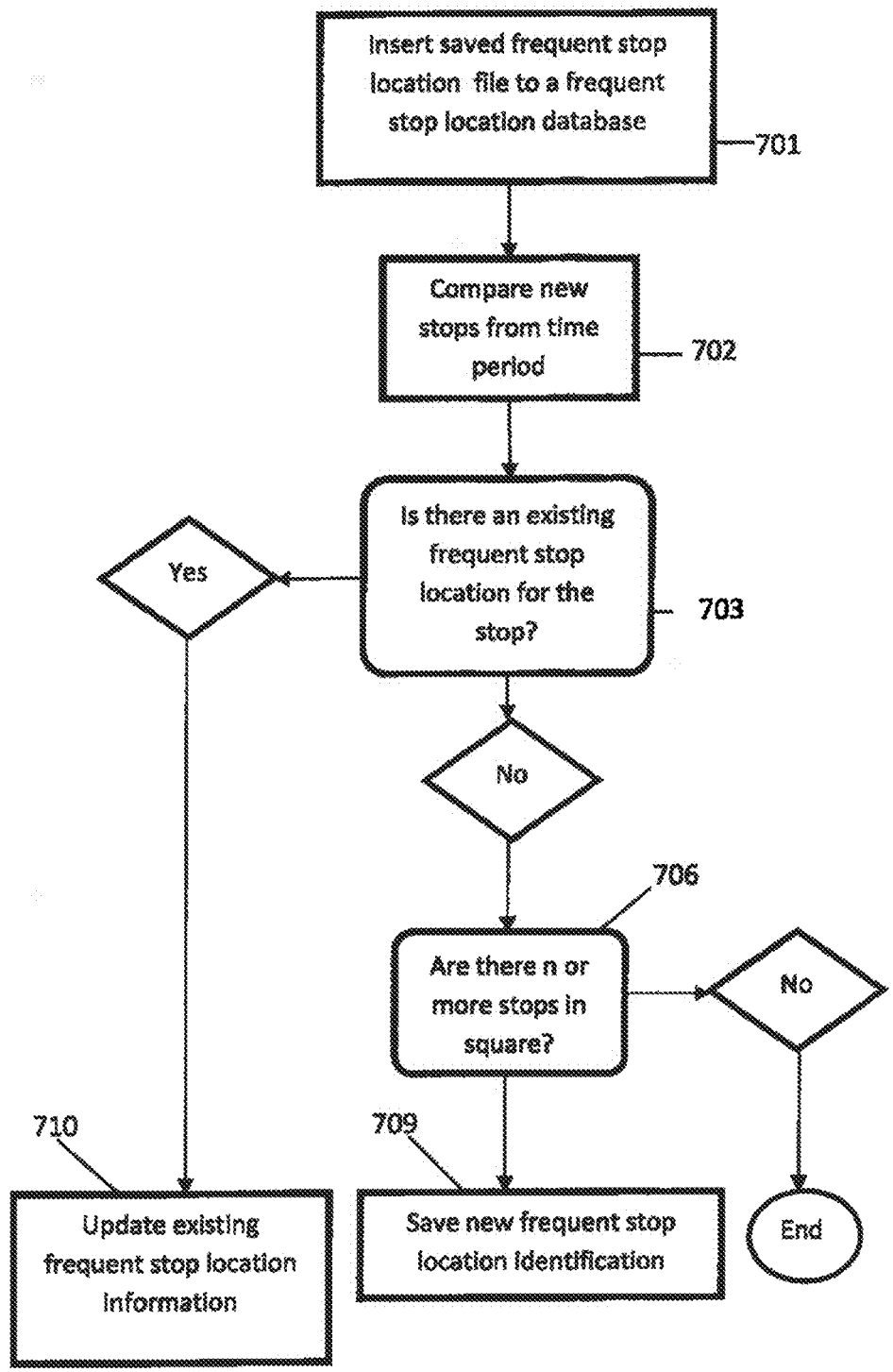

In an embodiment shown in FIG. 7, the system is configured for updating frequent stop locations for an entity such as a fleet. After one or more frequent stop locations for a fleet have been identified, the system can record vehicle stops for a period of time subsequent to identifying and establishing frequent stop locations and updating the frequent stop locations with the subsequently recorded stops. As shown at block 701, the system inserts a new frequent stop location file of subsequently recorded stops to a frequent stop location database. The system is also configured to determine whether one or more subsequently recorded vehicle stops are associated with an existing frequent stop location; or determining if the subsequently recorded vehicle stop(s) meet a criterion for a new frequent stop location. At block 702, the system determines whether any subsequently recorded vehicle stops are associated with an existing frequent stop location by comparing information about the subsequently recorded vehicle stops against saved frequent stop location identification information. For example the new file can be compared against an existing frequent stop location file created or saved from a prior time period, as described above. The system can compare, for example, frequent stop location identification information including any or all of: a location associated with the frequent stop location; an address associated with the frequent stop location a name associated with the frequent stop location; or a total number of stops for a frequent stop location. At block 703 the system determines if at least one existing frequent stop location matches the new stop at least one existing frequent stop location matches any stops from the new stops, at block 710 the system updates the existing frequent stop location(s) with the new information, such as adding any stops to the total stop count for respective frequent stop locations.

If there is not an existing frequent stop location, at block 706 the system determines if the stop meets a frequent stop location threshold criterion for identifying a frequent stop location as described herein (for instance as shown at FIG. 6). For example, the system may determine that a new, non-overlapping area that previously had no stops now has over 15 stops in a 0.1 radius and boundaries derived therefrom, as described herein, where the threshold criterion for stops is 10 or more. In such case at block 709 the system identifies and saves this as a new frequent stop location for the fleet. If, however, the number of stops does not meet the threshold at block 708, the process ends, although as noted below, the in certain embodiments the stops may be saved and rolled in to a subsequent update or predetermined number of updates over subsequent time periods to determine if the area should be identified as a new frequent stop location.

The updating process can be repeated continually, for example on a periodic basis. Accordingly, frequent stop locations can be updated, for example every 1 month, 2 months, every 3 months (e.g., every quarter), or even every week. In one embodiment, the periods or any other choice of time for updating can be customized or adjusted to fit a given entity's needs. In another embodiment, the system is configured to offer updates on a fixed basis, for example, a period in the range of every 1-6 months (e.g., every 3 months or every month). For example in one embodiment the system updates on a fixed, non-overlapping basis every month to determine if there are any new frequent stop locations, and does not save any stop locations that do not meet the threshold at each update In an embodiment, the system is configured to update at different periods over time. This embodiment can be implemented a "rolling" system that updates for a number of time periods (e.g., every month for 3 months) saving a record of seed stops from the analysis of the prior time period that did not meet the threshold. For example after an initial determination of frequent stop locations, the system updates every month for 3 months on a rolling basis, and then on a fixed, non-rolling basis every 3 months thereafter. The system rolls these stops over the number of time periods (e.g., 3 months), whereupon if in that given number of time periods the number of recorded stops meets or exceeds the threshold, then the area is saved as a frequent stop location.

As will be appreciated, the above-noted examples of fixed and rolling updates can be configured in any number of ways depending on, for example, the needs of the fleet or combinations or other implementations as may be useful (e.g., continually rolling updates, rolling updates at certain time periods and fixed updates at others, or fixed updates with no rolling or overlapping stops).

As explained above, the computer system includes a GPS event database. The GPS event data is analyzed to derive a plurality of operational metrics for each of a plurality of vehicles; and can also be configured to identify, from the analysis, at least one trend for a GPS event history using the GPS event data. The system can be configured to provide to a graphic user interface an interactive display configured display a representation (e.g., a graphic presentation of the trend). Reports and alerts based on GPS data and tracking and trending can be provided, including for frequent stop locations, driving behavior including vehicle speed (including average speed and high speed), engine start-up and shut-down, idling time, number of stops or any others including as described herein A description of systems and methods for accumulating and presenting data for GPS data for a fleets and vehicles, including for operational metrics and trends, can be found in U.S. patent application Ser. No. 13/097,689 entitled SYSTEM AND METHOD FOR PROVIDING VEHICLE AND FLEET PROFILES AND PRESENTATIONS OF TRENDS, the entirety of which is incorporated by reference herein.

Figure 8B:
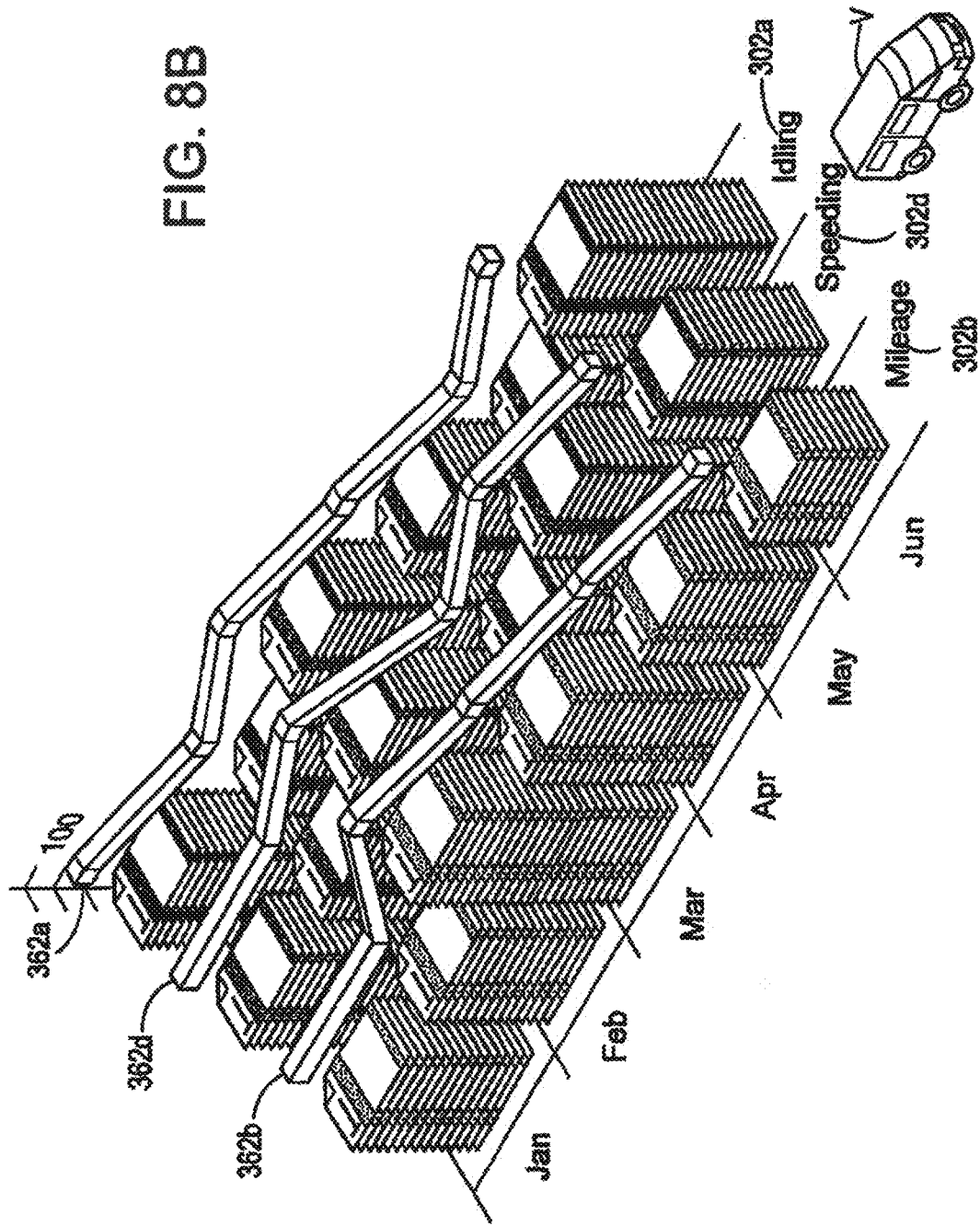

FIGS. 8A-8C shown a graphic flow for analyzing received GPS event data and GPS data stored over time to identify, report, and display trending. As shown in FIG. 8A, GPS event data for each vehicle, as described herein, is gathered over a period of time. The data is analyzed for over time (shown over 6 months) derive operational metrics 302, for example, mileage 302b, speeding, 302d and idling 302a. Trending can also be derived and displayed for other operational metrics as described herein or other such metrics as are or become available using data from GPS events and external databases. Such data can be analyzed for each month to identify statistics for each operational metric, for example, for each vehicle or employee, as well as to derive statistic for the fleet (e.g. averages under each operational metric, or averages for defined groups under each metric, frequent stop locations). Such data can be collected and stored indefinitely.

As shown in FIG. 8B, the analyzed historical event data for each operational metric 302 shows trend data 362, for example, the performance of a vehicle/driver v over the 6 month period, for example, a mileage trend 362b, a speeding trend, 362d and an idling trend 362a for each month. As shown in FIG. 8C, the trend data 362 for each operational metric can then be extrapolated from the GPS event data. This trend data is extrapolated for each vehicle in a fleet, as well as for each employee, and can be used in conjunction with other databases to provide trending and statistical data as described herein. Trend data includes not only the direction in which performance and behavior move under operational metrics, but also identifiable changes in those movements and comparisons therebetween, as well as statistical data drawn from GPS data and other databases, as described herein.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

The invention claimed is:

1. A computer system including at least one computer processor and computer readable storage medium or media including computer code and at least one storage device in which is stored GPS data for at least one vehicle the system comprising:
   a memory including
      a GPS event database including GPS event data transmitted from at least one GPS device, each GPS device associated with a vehicle, and stored over a period of time;
   the one or more processors programmed at least to
      receive GPS event data transmitted from at least one GPS device, each GPS device associated with a vehicle, the event GPS event data including location information for the vehicle;
      store the GPS event data in a GPS event database operatively coupled to at least one of the processors;
      analyze the GPS event data to derive and record vehicle stops for at least one vehicle determine if the number of stops meets a location identification criterion; and
      automatically identify at least one frequent stop location based on the vehicle stops.

2. The computer system of claim 1, wherein the one or more processors are further programmed at least to:
  identify a stop location for a vehicle;
  define an area for the stop location;
  determine whether a number of the recorded vehicle stops in the area meets a threshold number of stops; and
  if the number of stops meets the threshold number of stops, identify the area as a frequent stop location.

3. The computer system of claim 2, wherein the one or more processors are further programmed at least to:
  record the vehicle stops for an entity associated with the vehicle over a predetermined period of time; and
  define the area around each stop location stored over the period of time.

4. The computer system of claim 2, wherein the one or more processors are further programmed at least to:
  exclude any stops associated with an identified frequent stop location from being identified as another frequent stop location.

5. The computer system of claim 2, wherein the one or more processors are further programmed at least to:
  identify the furthest outside stops in the area; and
  define a boundary shape for the frequent stop location using the furthest outside stops.

6. The computer system of claim 2, wherein the one or more processors are further programmed at least to:
  associate vehicle stop information with the identified frequent stop location.

7. The computer system of claim 6, wherein the vehicle's stop information includes location information.

8. The computer system of claim 7, wherein the location information comprises an address.

9. The computer system of claim 8, wherein the vehicle stop information includes a time and an entity identifier.

10. The computer system of claim 2, wherein the one or more processors are further programmed at least to:
  determine the area as a function of the distance from the stop location of the vehicle.

11. The computer system of claim 10, wherein the distance is in a radius of about 0.1 miles.

12. The computer system of claim 11, wherein the threshold number of vehicle stops in a range of 5 to 10.

13. The computer system of claim 12, wherein the threshold number of vehicle stops is 5.

14. The computer system of claim 12, wherein the threshold number of vehicle stops is 10.

15. The computer system of claim 10, wherein the threshold number of vehicle stops in a range of 2 to 50.

16. The computer system of claim 2, wherein the threshold number of vehicle stops in a range of 2 to 50.

17. The computer system of claim 16, wherein the threshold number of vehicle stops in a range of 5 to 10.

18. The computer system of claim 17, wherein the threshold number of vehicle stops is 5.

19. The computer system of claim 18, wherein the threshold number of vehicle stops is 10.

20. The computer system of claim 2, wherein the one or more processors are further programmed at least to:
  identify the least one frequent stop location;
  record vehicle stops for a period of time subsequent to identifying the at least one frequent stop location; and
  update the frequent stop locations with the subsequently recorded stops.

21. The computer system of claim 20, wherein updating comprises:
  determining whether the subsequently recorded vehicle stop is associated with an existing frequent stop location; or
  determining if the subsequently recorded vehicle stop meets a criterion for a new frequent stop location.

22. The computer system of claim 21, wherein the determining whether the subsequently recorded vehicle stop is associated with an existing frequent stop location comprises:
  comparing information about the subsequently recorded vehicle stops against saved frequent stop location identification information.

23. The computer system of claim 22, wherein saved frequent stop location identification information comprises at least one of:
  a location associated with the frequent stop location;
  an address associated with the frequent stop location;
  a name associated with the frequent stop location; and
  a total number of stops for a frequent stop location.

24. The computer system of claim 2 wherein the identification of a stop location for a vehicle includes identifying a stop from an operational metric from the GPS event data.

25. The computer system of claim 24 wherein operational metric comprises an operational metric selected from an engine on/off event and an engine idling event.

26. The computer system of claim 1, wherein the one or more processors are further programmed at least to:
  rank a plurality of frequent stop locations.

27. The computer system of claim 26, wherein the one or more processors are further programmed at least to:
  determine a total number of recorded vehicle stops for each of the plurality of frequent stop locations; and
  rank the frequent stop locations by the total number of recorded stops in each frequent stop locations.

28. The computer system of claim 1, wherein the one or more processors are further programmed at least to:
  provide, for a graphic user interface, a representation including a representation of the frequent stop location.

29. The computer system of claim 28, wherein the one or more processors are further programmed at least to provide, for the graphic user interface, a representation comprising at least one of:
  a name for a frequent stop location;
  an address for a frequent stop location;
  a ranking of a frequent stop location;
  a number of vehicles that stopped at a frequent stop location;
  a number of stops for a frequent stop location;
  a duration of stop for a frequent stop location; and
  an arrival time for a frequent stop location.

30. The computer system of claim 29, wherein the one or more processors are further programmed at least to provide, for the graphic user interface, a representation comprising at least one of:
  an average stop duration;
  an average arrival time;
  an average travel time;
  an average distance travelled;
  a distance from a frequent stop location.

31. The computer system of claim 30, wherein the one or more processors are further programmed at least to provide, for the graphic user interface, at least one of:
  a geographic criterion for at least one frequent stop location;
  a time period criterion for at least one frequent stop location;
  a rank criterion; and
  a distance criterion.

32. The computer system of claim 29, wherein the one or more processors are further programmed at least to allow a user to manually designate the frequent stop location as a point of interest.

33. The computer system of claim 28, wherein the one or more processors are further programmed at least to provide, for the graphic user interface, at least:
a map showing the frequent stop location.

34. The computer system of claim 28, wherein the one or more processors are further programmed at least to provide, for the graphic user interface, at least:
a ground level view of the frequent stop location.

35. A method comprising, in at least one computer and a computer readable storage medium or media including computer code:
receiving GPS event data transmitted from a plurality of GPS devices, each GPS device associated with a vehicle;
storing in GPS event database operatively coupled to at least one of the processors, the GPS event data;
analyzing the GPS event data to derive and record vehicle stops for at least one vehicle;
determining if the number of stops meets a frequent stop location criterion; and
automatedly identifying at least one frequent stop location based on the vehicle stops.

36. The method of claim 35, further comprising:
identifying a stop location for a vehicle;
defining an area for the stop location;
determining whether a number of the recorded vehicle stops in the area meets a threshold number of stops; and
if the number of stops meets the threshold number of stops, identifying the area as a frequent stop location.

37. The method of claim 36, further comprising:
recording the vehicle stops for an entity associated with the vehicle over a predetermined period of time; and
defining the area around each stop location stored over the period of time.

38. The method of claim 36, further comprising:
excluding any stops associated with an identified frequent stop location from being identified as a separate frequent stop location.

39. The method of claim 36, further comprising:
identifying the furthest outside stops in the area; and
defining a boundary shape for the frequent stop location using the furthest outside stops.

40. The method of claim 36, further comprising:
associating vehicle stop information with the identified frequent stop location.

41. The method of claim 40, wherein the vehicle stop information includes location information.

42. The method of claim 41, wherein the location information comprises an address.

43. The method of claim 42, wherein the vehicle stop information includes a time and an entity identifier.

44. The method of claim 35, further comprising:
ranking a plurality of frequent stop locations.

45. The method of claim 36, further comprising:
determining the area as a function of the distance from the stop location of the vehicle.

46. The method of claim 45, wherein the distance is in a radius of about 0.1 miles.

47. The method of claim 46, wherein the threshold number of vehicle stops in a range of 5 to 10.

48. The method of claim 47, wherein the threshold number of vehicle stops is 5 and the distance is in a radius of about 0.1 miles.

49. The method of claim 48, wherein the threshold number of vehicle stops is 10 and the distance is in a radius of about 0.1 miles.

50. The method of claim 45, wherein the threshold number of vehicle stops in a range of 2 to 50.

51. The method of claim 36, further comprising:
identifying the least one frequent stop location;
recording vehicle stops for a period of time subsequent to identifying the at least one frequent stop location; and
updating the frequent stop locations with the subsequently recorded stops.

52. The method of claim 51, wherein updating comprises:
determining whether the subsequently recorded vehicle stop is associated with an existing frequent stop location; or
determining if the subsequently recorded vehicle stop meets a criterion for a new frequent stop location.

53. The method of claim 52, wherein the determining whether the subsequently recorded vehicle stop is associated with an existing frequent stop location comprises:
comparing information about the subsequently recorded vehicle stops against saved frequent stop location identification information.

54. The method of claim 53, wherein saved frequent stop location identification information comprises at least one of:
a location associated with the frequent stop location;
an address associated with the frequent stop location;
a name associated with the frequent stop location; and
a total number of stops for a frequent stop location.

55. The method of claim 36 wherein the identification of a stop location for a vehicle comprises:
identifying the stop from an operational metric from the GPS event data.

56. The method of claim 55 wherein operational metric comprises an operational metric selected from an engine on/off event and an engine idling event.

57. The method of claim 44, further comprising:
determining a total number of recorded vehicle stops for each of the plurality of frequent stop locations; and
ranking the frequent stop locations by the total number of recorded stops in each frequent stop location.

58. The method of claim 36 wherein the threshold number of vehicle stops in a range of 2 to 50.

59. The method of claim 58, wherein the threshold number of vehicle stops in a range of 5 to 10.

60. The method of claim 59, wherein the threshold number of vehicle stops is 5.

61. The method of claim 59, wherein the threshold number of vehicle stops is 10.

62. The method of claim 35, further comprising:
providing, for a graphic user interface, a representation including a representation of the frequent stop location.

63. The method of claim 62, wherein the method further comprises providing, for the graphic user interface, a representation comprising at least one of:
a name for a frequent stop location;
an address for at frequent stop location;
a ranking of a frequent stop location;
a number of vehicles that stopped at a frequent stop location;
a number of stops for a frequent stop location;
a duration of stop for a frequent stop location; and
an arrival time for a frequent stop location.

64. The method of claim 63, wherein the method further comprises providing, for the graphic user interface, a representation comprising at least one of:
an average stop duration;
an average arrival time;
an average travel time;
an average distance travelled;
a distance from a frequent stop location.

65. The method of claim 64, wherein the method further comprises providing, for the graphic user interface, a representation comprising at least one of:
- a geographic criterion for at least one frequent stop location;
- a time period criterion for at least one frequent stop location;
- a rank; and
- a distance.

66. The method of claim 63, wherein the method further comprises providing, for the graphic user interface, an interface to allow a user to manually designate the frequent stop location as a point of interest.

67. The method claim 62, wherein the method further comprises providing, for the graphic user interface, a representation comprising at least one of:
- a map including the frequent stop location.

68. The method of claim 62, wherein the method further comprises providing, for the graphic user interface, a representation comprising at least one of:
- a ground level view of the frequent stop location.

\* \* \* \* \*